Figure 1:
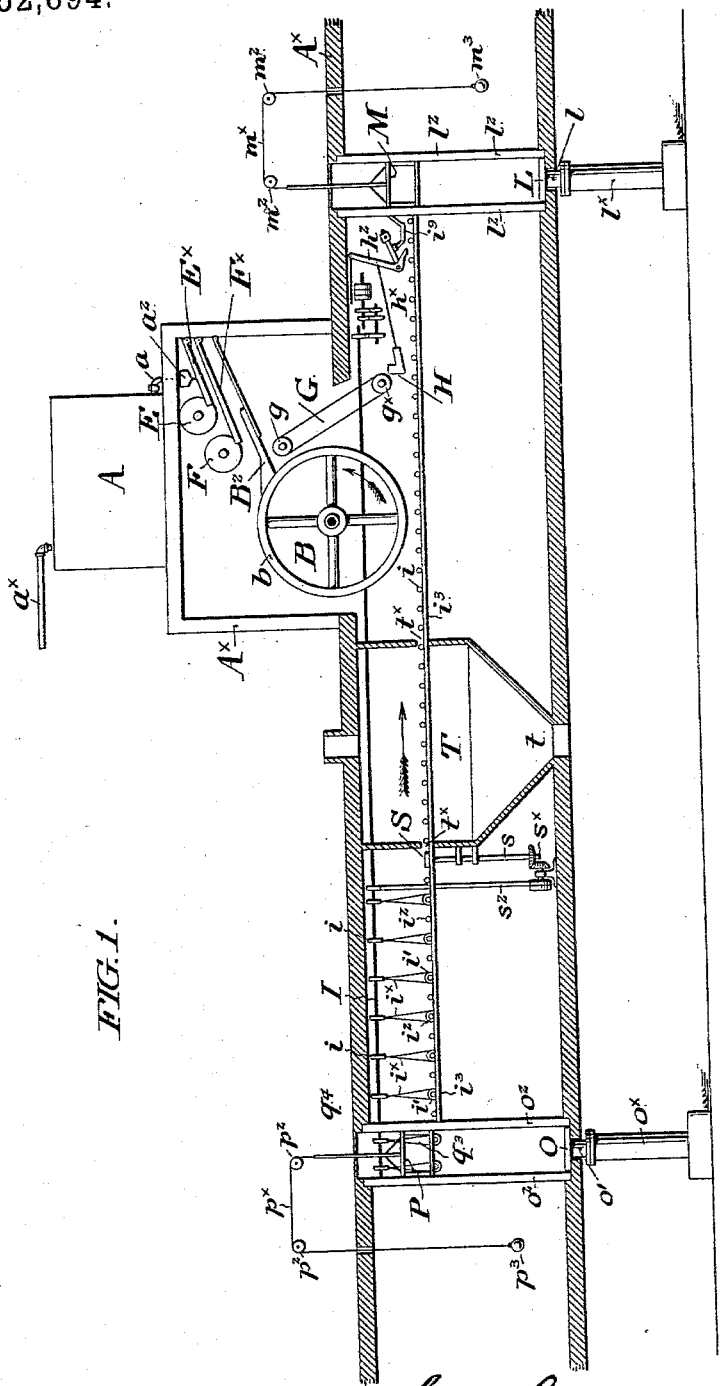

(No Model.) 13 Sheets—Sheet 5.
C. W. COOPER.
PROCESS OF AND APPARATUS FOR MAKING GLUE.
No. 552,894. Patented Jan. 14, 1896.

WITNESSES:
A. E. Paige
F. Norman Dixon

C. W. Cooper, INVENTOR
By his Attorneys,
Wm C. Strawbridge
J Bonsall Taylor

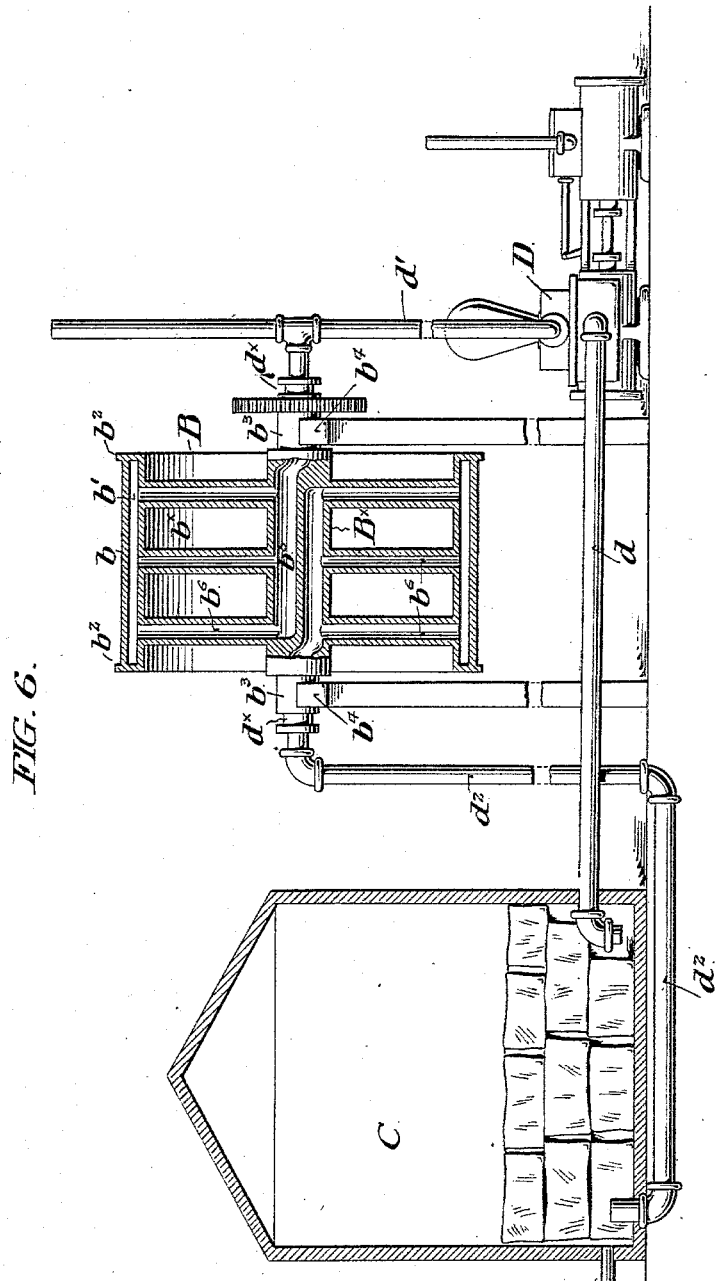

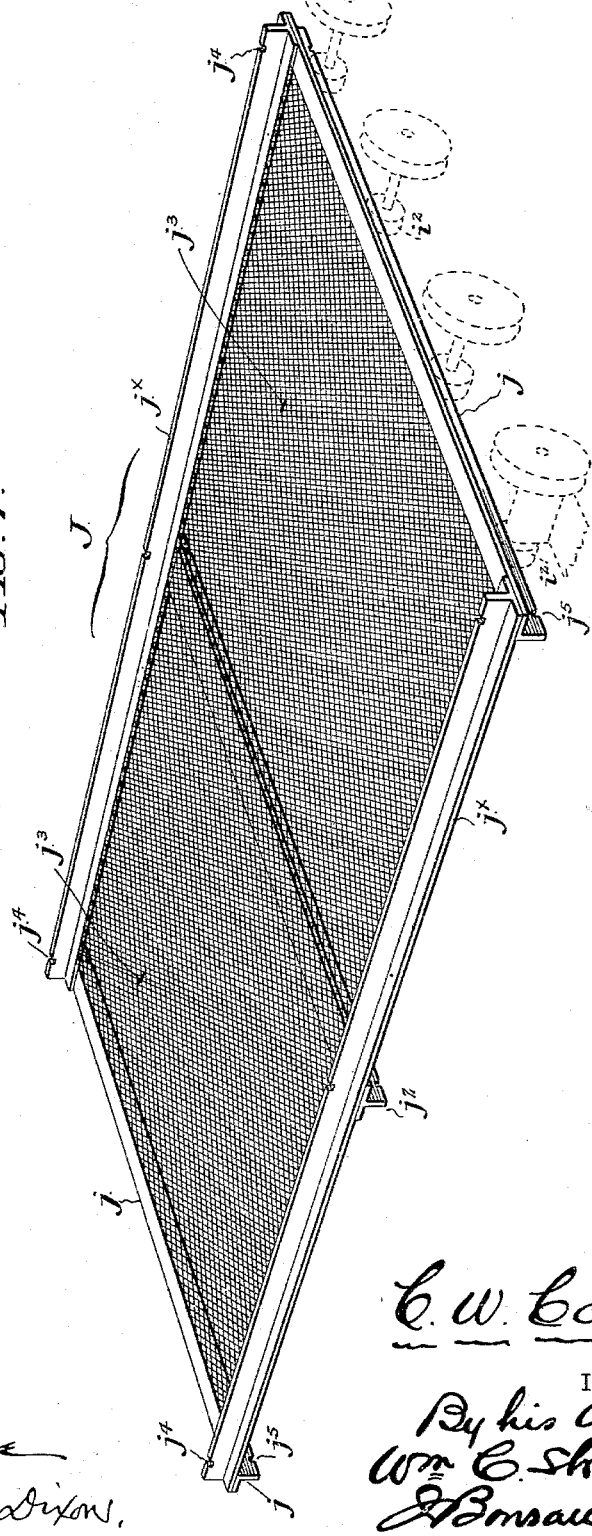

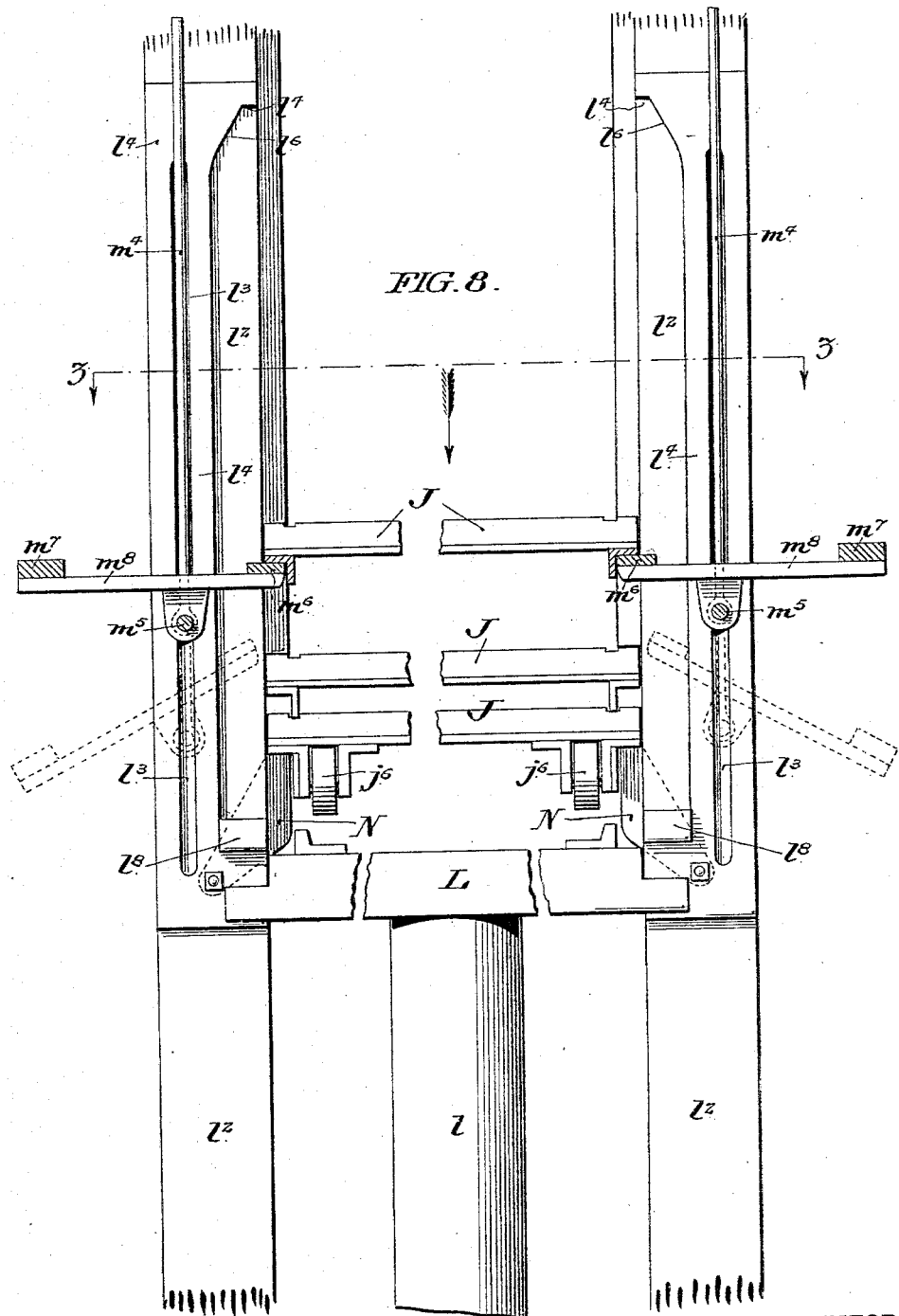

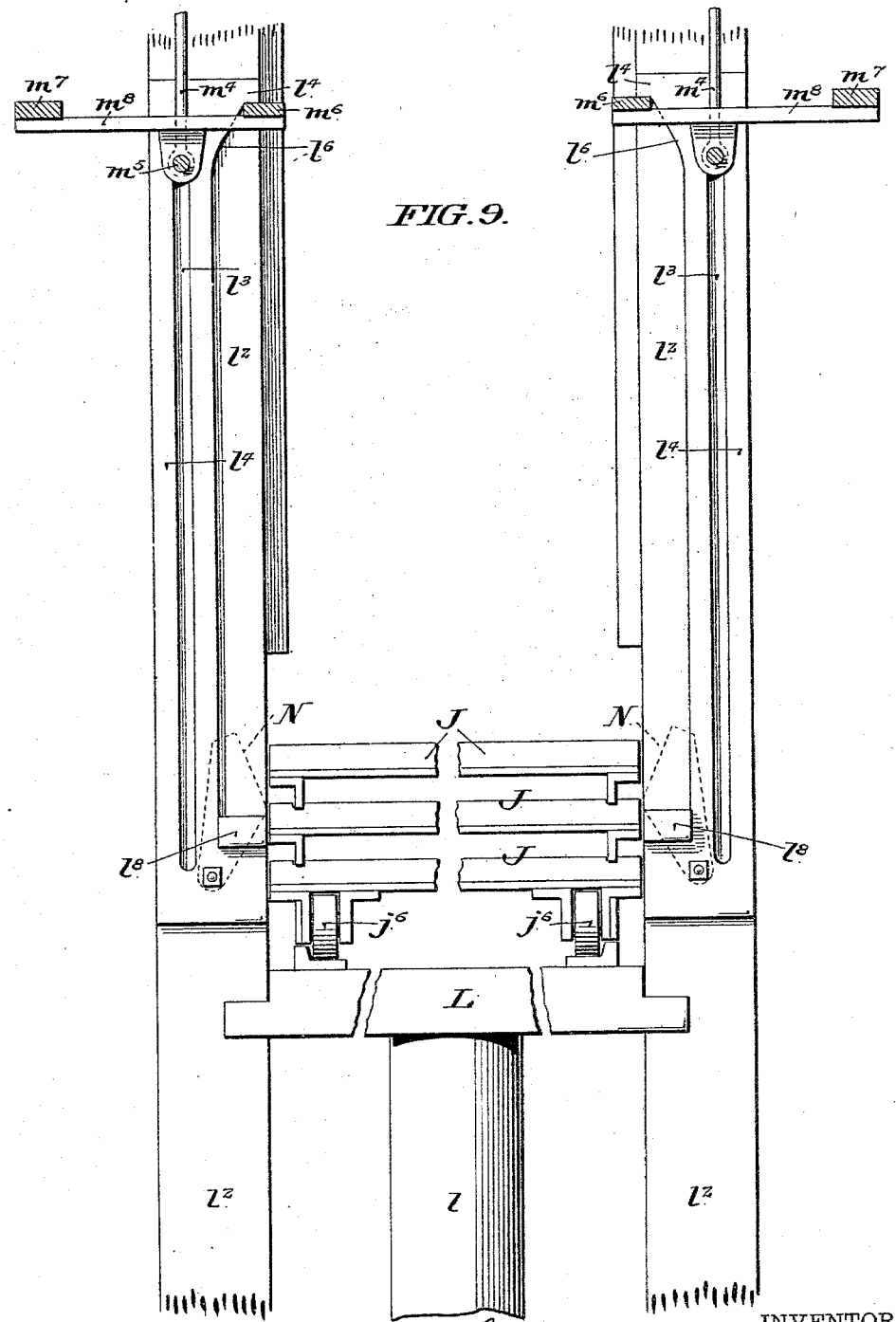

(No Model.)  13 Sheets—Sheet 10.
C. W. COOPER.
PROCESS OF AND APPARATUS FOR MAKING GLUE.
No. 552,894.  Patented Jan. 14, 1896.
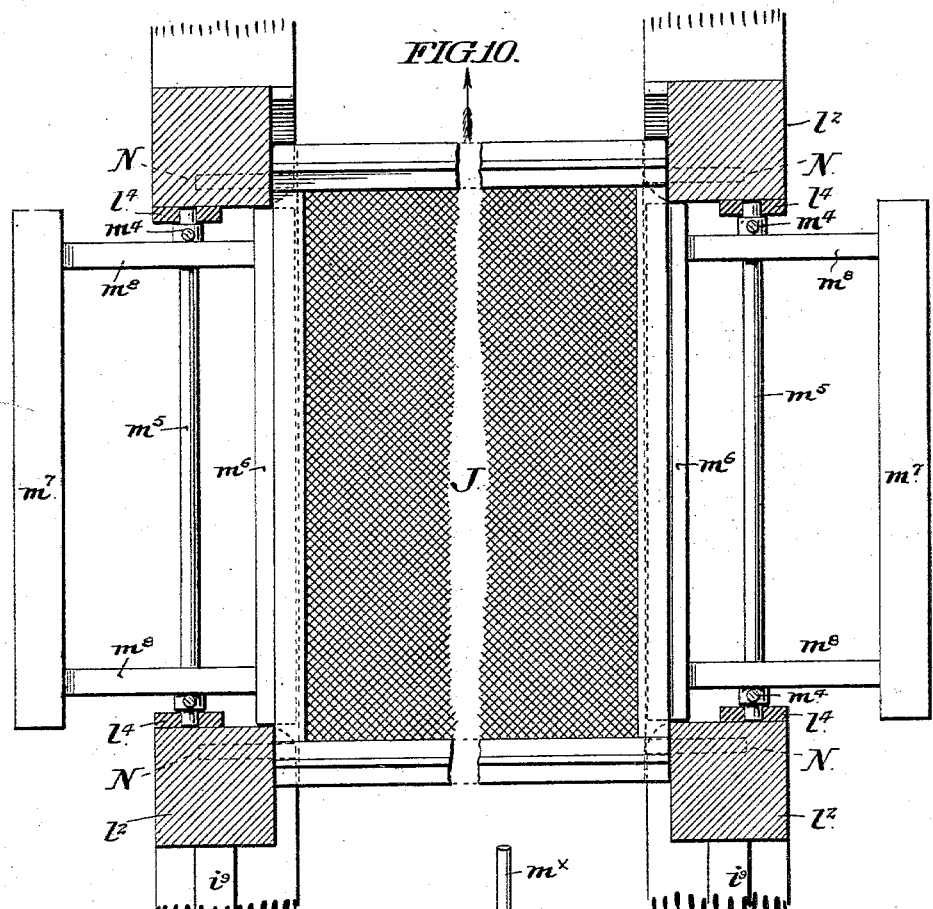
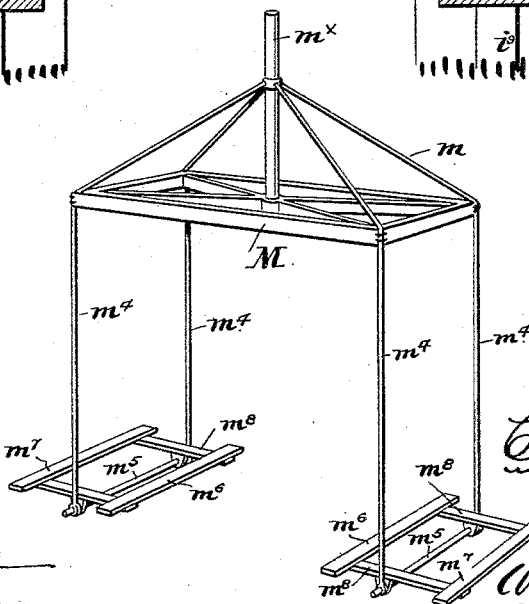

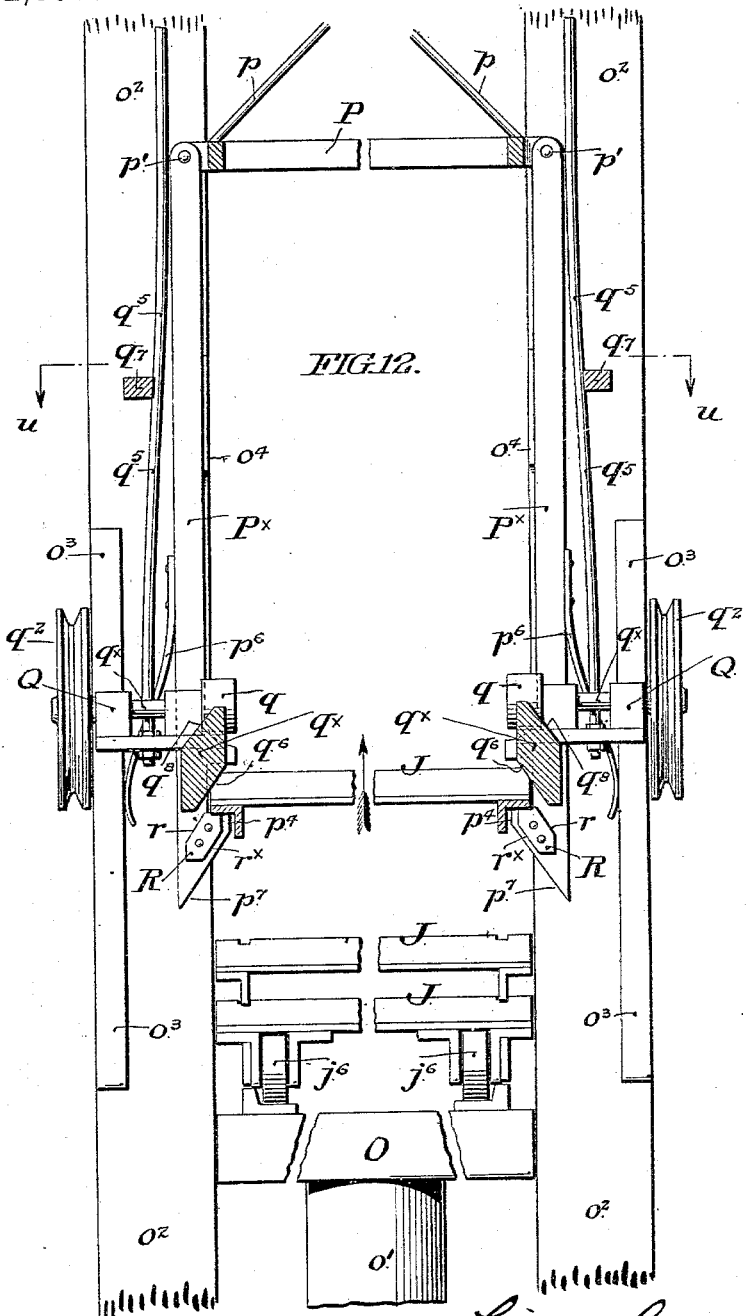

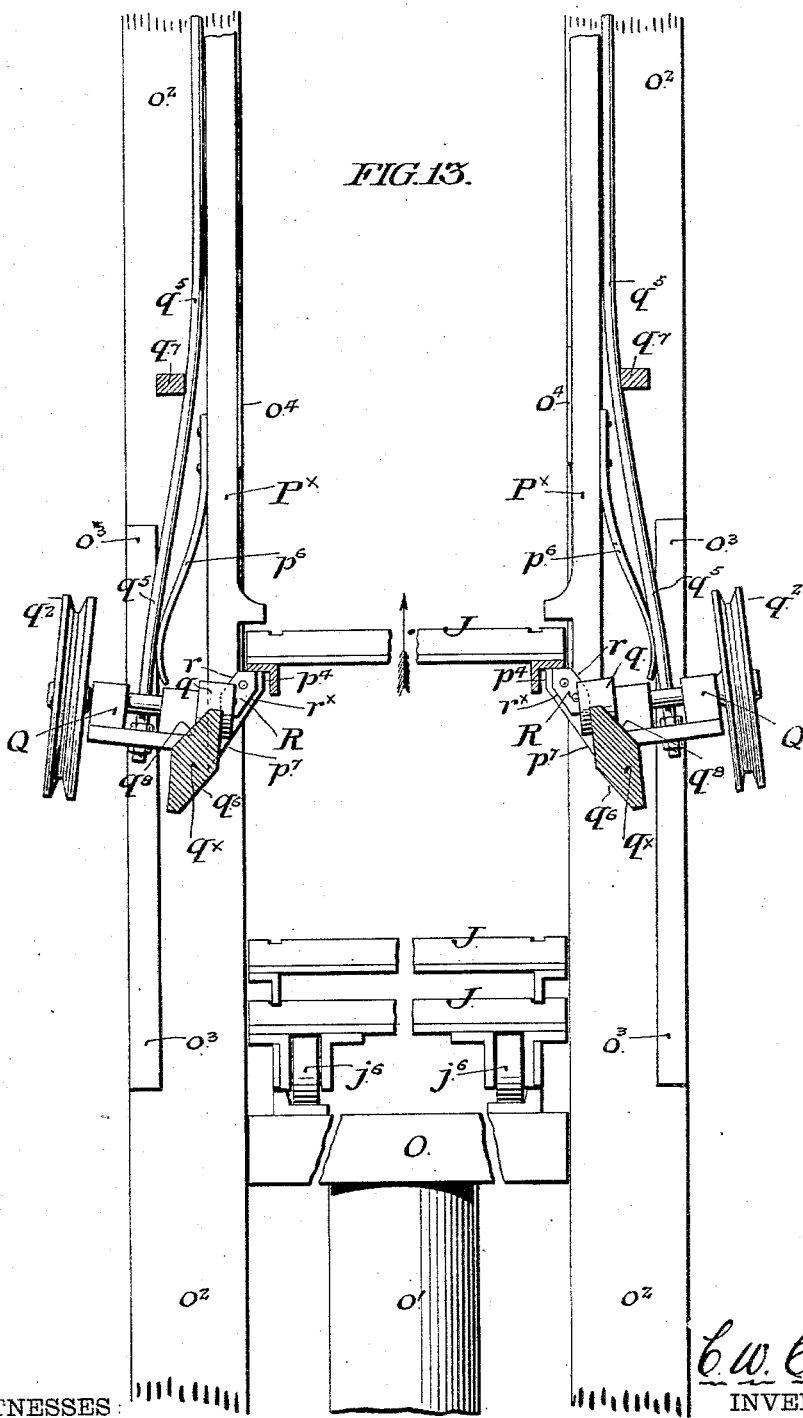

(No Model.) 13 Sheets—Sheet 13.

C. W. COOPER.
PROCESS OF AND APPARATUS FOR MAKING GLUE.

No. 552,894. Patented Jan. 14, 1896.

WITNESSES:
N. E. Paige
F. Norman Dixon

C. W. Cooper
INVENTOR
By his Attorneys,
Wm C. Strawbridge
J. Bonsall Taylor

UNITED STATES PATENT OFFICE.

CHARLES W. COOPER, OF NEW YORK, N. Y.

PROCESS OF AND APPARATUS FOR MAKING GLUE.

SPECIFICATION forming part of Letters Patent No. 552,864, dated January 14, 1896.

Application filed February 15, 1894. Serial No. 500,245. (No model.)

*To all whom it may concern:*

Be it known that I, CHARLES W. COOPER, a citizen of the United States, residing in the city, county, and State of New York, have invented certain new and useful Improvements in the Manufacture of Glue, of which the following is a specification.

My invention relates especially to operations connected with the formation of glue into sheets of jelly, and to operations for drying the sheets of jelly and for breaking up or "stripping" the dried sheets from the drying-nets; and it comprehends improvements in methods of and in apparatus for effecting such operations upon a large scale but in an economical, practically continuous, and efficient manner.

Machinery embodying my improvements and adapted to effectuate my method is represented in the accompanying drawings and hereinafter described, the particular subject-matter claimed as novel being hereinafter definitely specified.

Before describing my apparatus in its detail it may facilitate an understanding of my invention to explain that, in the preferred conduct of my process, liquid glue is first subjected to an operation of preliminary cooling before it is spread upon the cooling-cylinder proper, upon the surface of which it is congealed to a sheet of jelly; that the sheet is then stripped from the aforesaid cylinder and cut or divided into sections which are successively deposited upon carrying-nets caused to travel away to an elevator upon which they are stacked, and which, when a given stack of nets has been formed upon it, descends to a drying-room; that the stacks of nets are then conducted through the drying-room, wherein the sheets upon them are dried; that the stacks of nets with the dried sheets upon them are then conducted to another elevator, by which they are lifted and delivered net by net to a system of conveyer-ways, over and by means of which they are caused to pass in a continuous succession through a compartment in which the sheets of dried glue upon them are broken up and stripped from them, and along which they are further conducted into position to receive succeeding sheets formed in the manner first mentioned, and are then delivered to the lowering-elevator to be again stacked and conducted to the drying-room and otherwise subjected to the manipulations referred to.

It should be further mentioned that the operations of congealing the liquid glue into a sheet of jelly upon a revolving cooling-cylinder, of the stripping of the sheet therefrom and its delivery to a carrying-net, of the drying of the sheets upon such nets, and of the subsequent breaking up of the dried glue upon the nets, are not, broadly considered, novel with me.

Certain features of the apparatus which relate to the means for effecting the continuous circulation of a fluid refrigerant through the cooling-cylinder, and to the particular mode of the stripping of the sheet from said cylinder, are, moreover, described and claimed in a pending application for patent filed by me June 15, 1891, Serial No. 396,291, to which reference is to be made.

Figure 2:
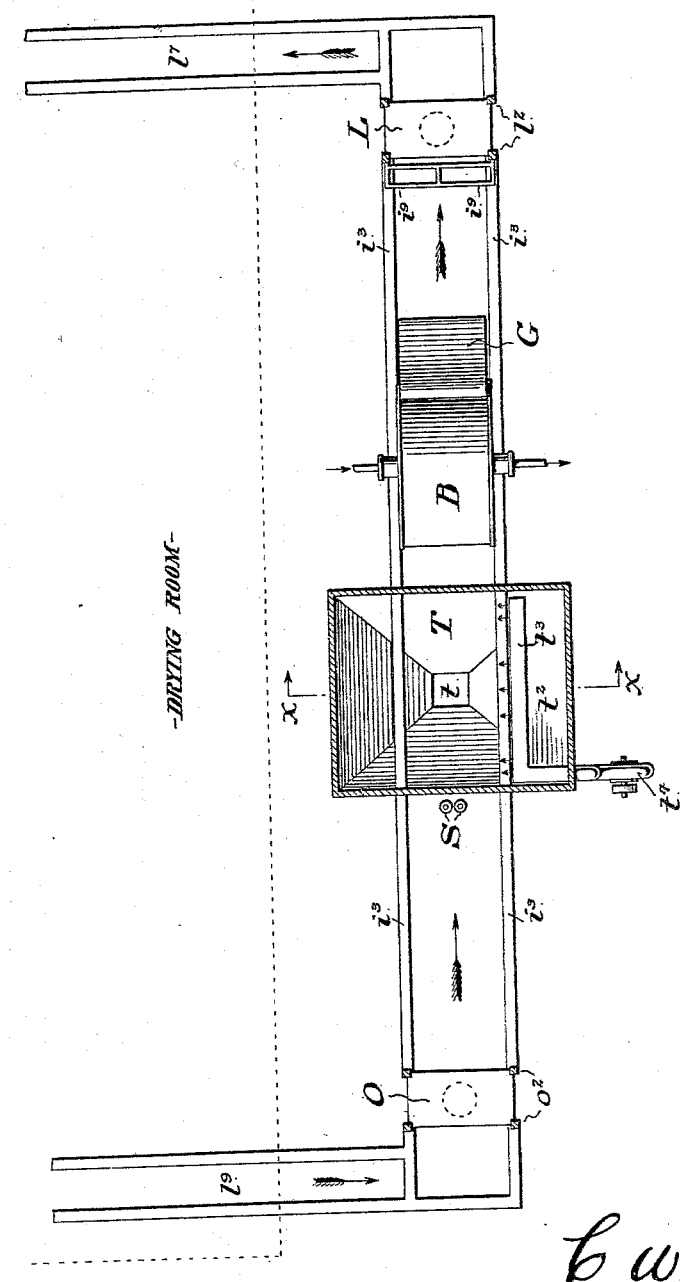
Figure 3:
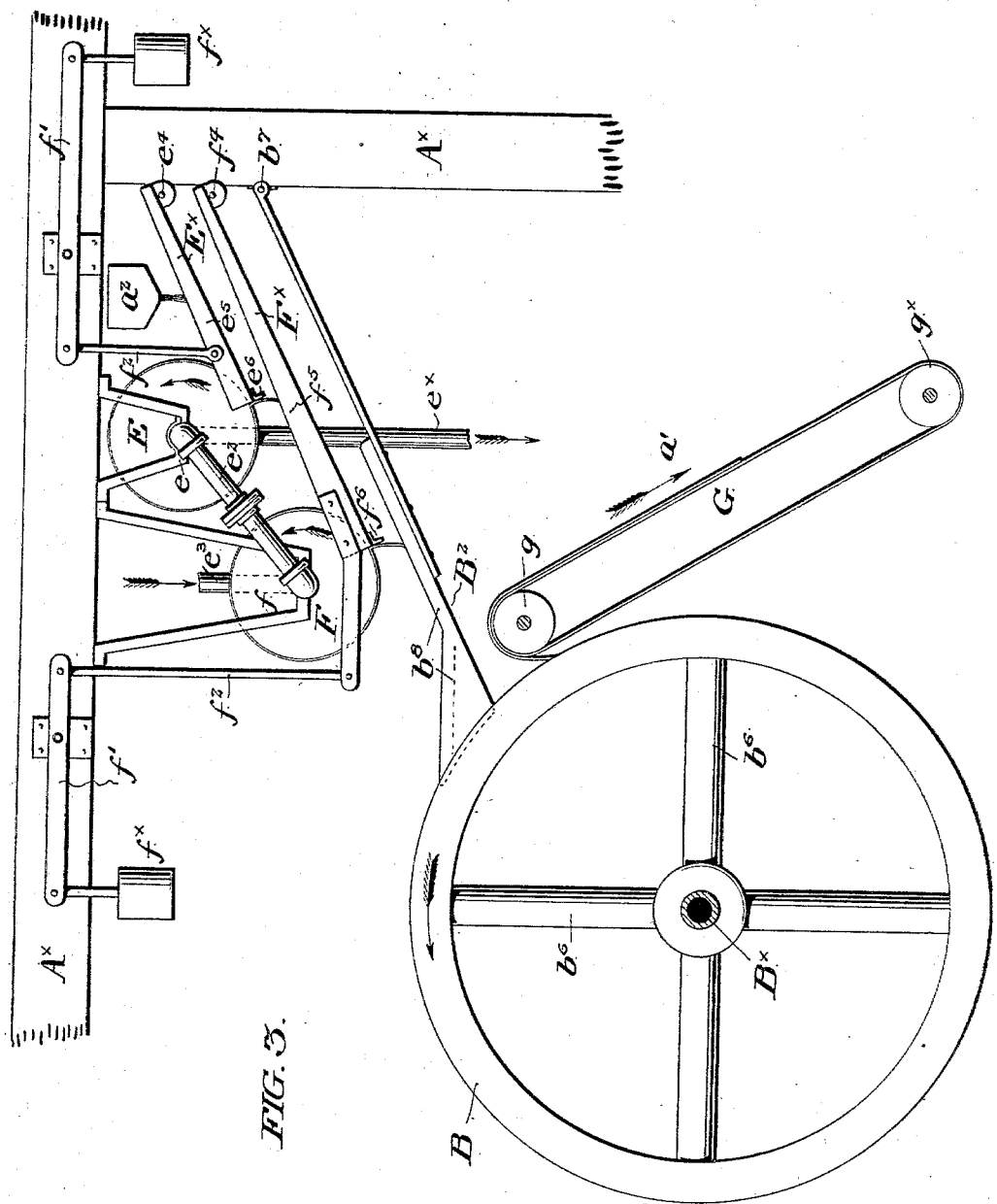
Figure 4:
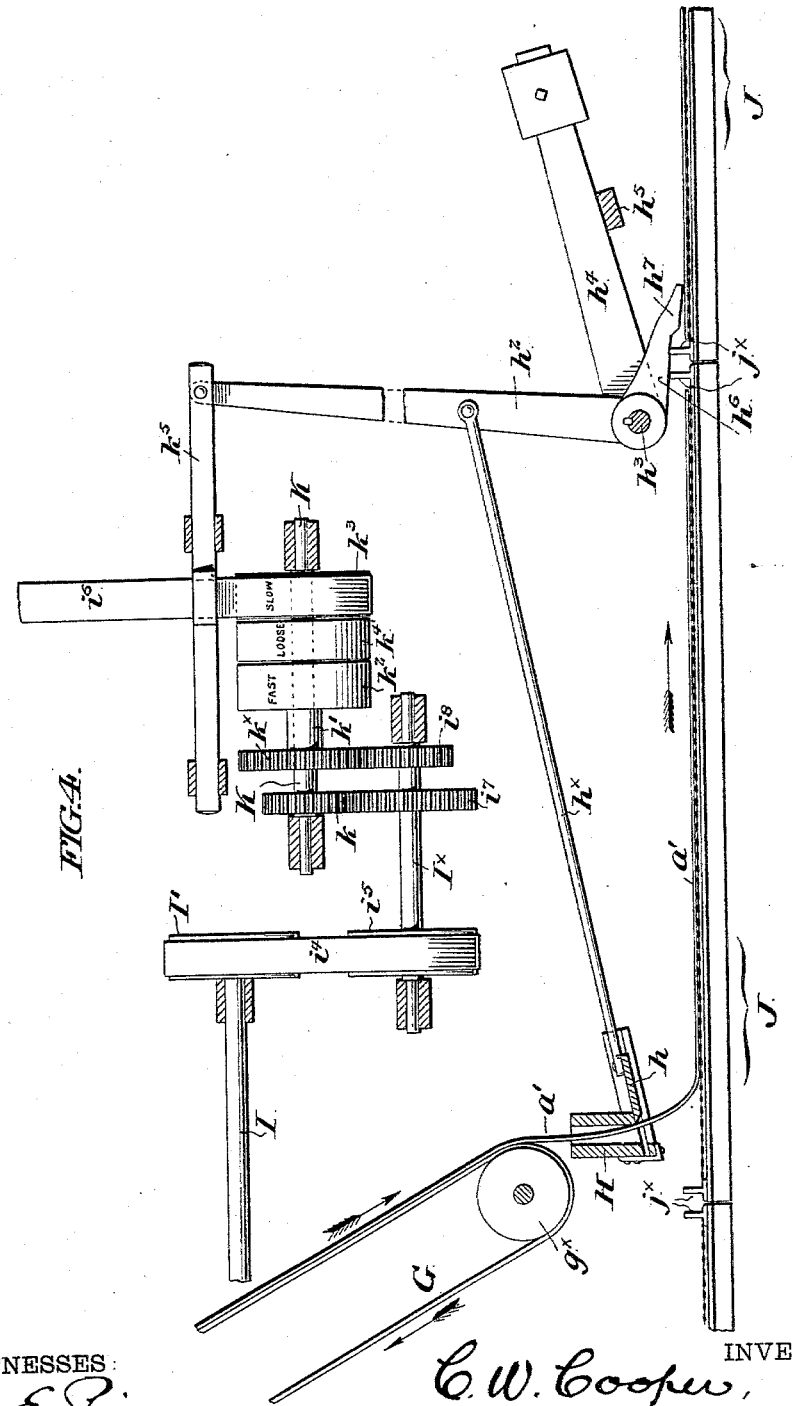
Figure 5:
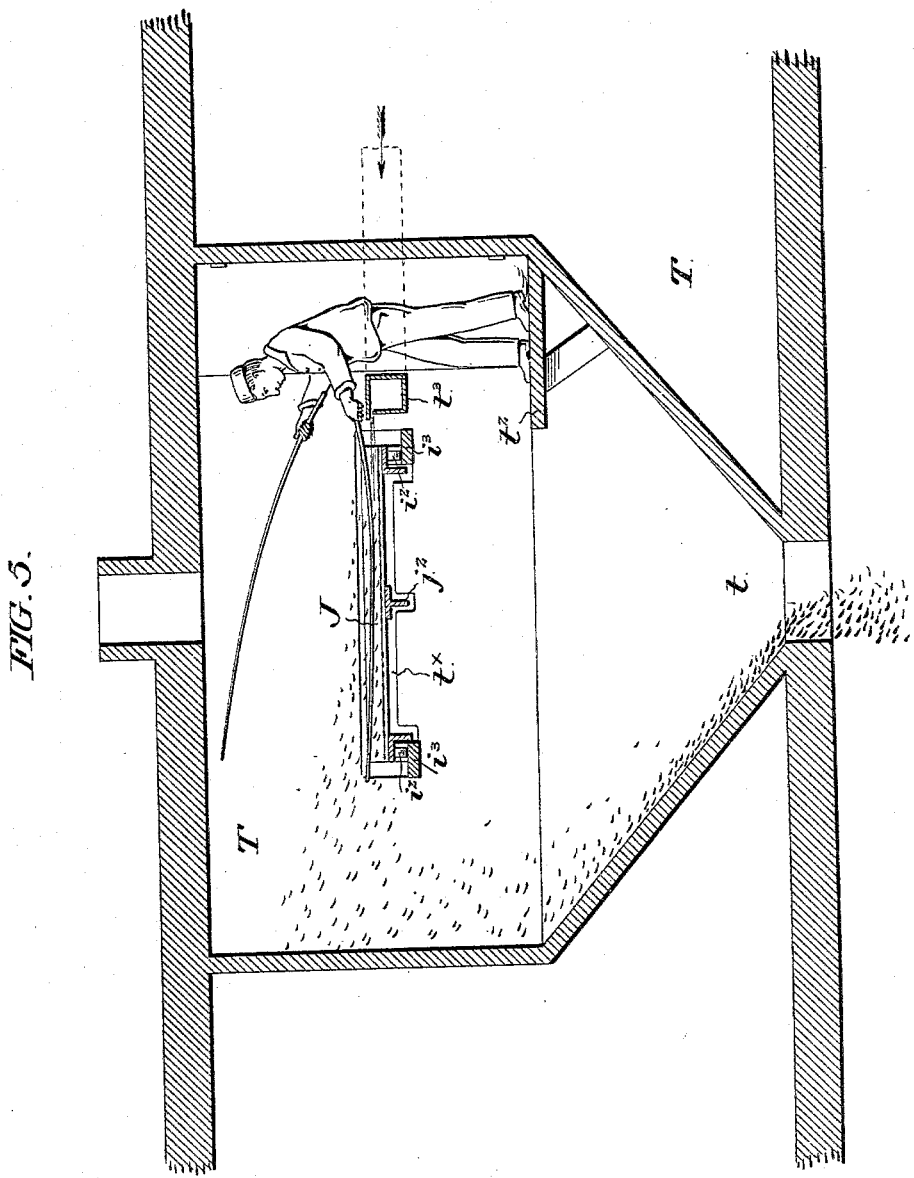
Figure 14:
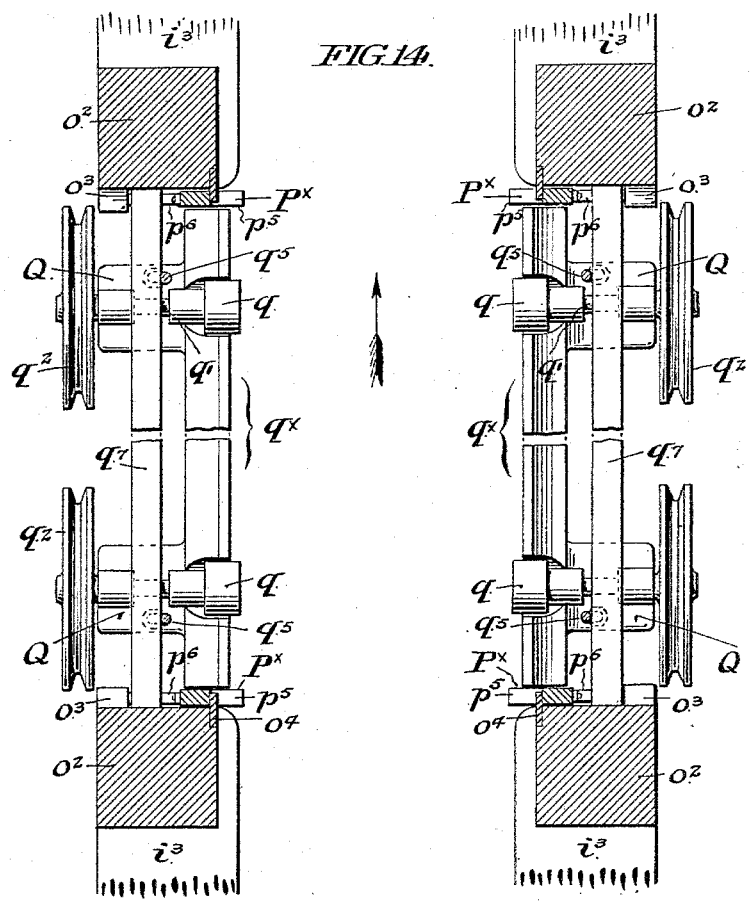
Figure 15:
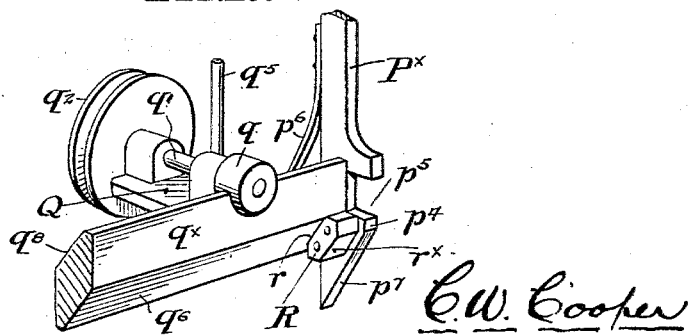

In the drawings, Figure 1 is a side elevational view, partly sectional, of an apparatus embodying my improvements in and adapted to effectuate my method of manufacturing glue. Fig. 2 is a top plan view of the apparatus of Fig. 1, indicating diagrammatically the drying-room. Fig. 3 is a side elevational view of an arrangement of cooling-drums which I find it convenient to resort to for effecting the preliminary cooling of the liquid glue, of the cooling-cylinder upon which the cooled glue is delivered and congealed into a sheet of jelly, and of the sheet stripping and delivering apron. Fig. 4 is a side elevational view of a good form of sheet dividing or cutting mechanism and of devices connected therewith for occasioning the operation of cutting and the accurate deposit of the cut sheets upon the nets, the view comprehending also a device for intermittently accelerating the speed of the traveling nets. Fig. 5 is a transverse vertical sectional elevational view through the stripping-room, in the plane of the dotted line *x x* in Fig. 2, and sight being taken in the direction of the arrows applied to said line. Fig. 6 is a central vertical transverse sectional elevation through the cooling-cylinder shown in Figs. 1, 2, and 3 and through an ice-chamber, not elsewhere represented, but adapted to be employed in connection with said cylinder and with appropriate pumping appliances and pipe connections for effecting the continuous circulation of a fluid refrigerant through the cylinder. Fig. 7 is a view in perspective of a net-frame of a construction which I prefer to employ. Fig. 8 is an end elevational view, in the direction of the arrow $y$ applied to the conveyer-ways in Fig. 2, of the lowering-elevator and of the net-frame "stacker" which operate in connection therewith, the view depicting in full lines the positions of the parts during the descent of the stacker and the lowering elevator-platform being elevated. Fig. 9 is a view similar to Fig. 8 of the same devices, with the stacker at the top of the elevator-well and with the lowering-platform assumed to be in the act of descending. Fig. 10 is a horizontal sectional top plan view through the lowering-elevator, the parts being in the position of the parts represented in Fig. 8 and section being supposed in the plane of the dotted line $z\ z$ applied to said Fig. 8. Fig. 11 is a view in perspective of the moving members of the stacker, which I employ in connection with the lowering-elevator. Fig. 12 is an end elevational view, in the direction of the arrow $w$ applied to Fig. 2, of the lifting-elevator and of the net-lifting devices and the net-delivering starter-ways, which are operative in connection therewith and with the conveyer-ways, the view representing the net-lifting hooks in the act of ascending with a net, the lifting-platform at rest in its elevated position and supporting a stack of nets, and the starter-ways in their normal position. Fig. 13 is a view similar to Fig. 12 of the same devices, the parts being represented in the positions which they occupy during the period when the starter-ways are spread apart to permit of the passage upwardly between them of a net-frame and the net-lifting hooks being shown almost at the top of their travel. Fig. 14 is a horizontal sectional top plan view through the lifting-elevator, the parts being in the position represented in Fig. 12 and section being supposed in the plane of the dotted line $u\ u$ applied to said Fig. 12. Fig. 15 is a fragmentary perspective detail of portions of one of the starter-ways and of one of the net-lifting hook-bars.

Similar letters of reference indicate corresponding parts.

*The Means for Forming the Sheet of Jellied Glue.*

Referring now to the first six figures of the drawings, which illustrate a good form of my apparatus as an entirety, without, however, depicting the details of the elevators illustrated in Figs. 8 to 15, A is a tank or reservoir, provided with a suitable outlet-faucet $a$, for containing liquid glue fed to it in any preferred manner—as, for instance, through the supply-pipe $a^\times$. This tank is conveniently supported upon the framework $A^\times$.

Omitting for the present a description of the devices by means of which the operation of the preliminary cooling of the liquid glue prior to its deposit upon the surface of the cooling or molding cylinder on which it is congealed and molded to the form of the ultimate sheet, B is the molding or cooling cylinder, preferably formed as a casting, having a smoothly-turned peripheral face. This cylinder is conveniently formed with two concentric cylindric webs, of which the outer, $b$, is the glue receiving and carrying surface, and the inner, $b^\times$, a web concentric with the outer web and disposed sufficiently apart from it to occasion the formation between the webs of an annular cooling and circulating chamber $b'$ laterally inclosed by radial flanges $b^2$, having peripheral extension from the inner to beyond the outer web, so as to form edges to prevent the liquid glue applied to the surface of the outer web from escaping laterally from off it.

$B^\times$ is a hollow shaft formed as a part of the cooling-cylinder, upon trunnions $b^3$ or extensions of which the cylinder is mounted for rotation in suitable bearings $b^4$. The shaft is internally longitudinally divided by a partition $b^5$ into two chambers which respectively communicate with the respective trunnions, and one of which, through a series of hollow spokes $b^6$, communicates with the annular cooling-chamber $b'$, and the other of which, through a corresponding series of hollow spokes, similarly communicates with said cooling-chamber at a point preferably diametrically opposite to the point of communication of the spokes first referred to.

It is obvious that cooling fluid (liquid or gaseous) admitted through one trunnion will be caused to pass to the cooling-chamber, to circulate throughout it, and to escape from it through the other trunnion.

$B^2$ is an inclined main chute upon which the liquid glue, preferably after subjection to preliminary cooling, is discharged, and by means of which it is delivered to the peripheral surface of the cooling-cylinder B. This chute is preferably hinged at its upper end, as at $b^7$, to the framework, and its lower or outer edge, which is of the breadth of the carrying-face of the cooling-cylinder, rests thereupon, preferably at a horizontal line not more than forty-five degrees below the top of the cylinder. This chute is provided with sides $b^8$, which, in the mounting of the parts, come within the flanges $b^2$ of the cooling-cylinder and are accurately shaped or conformed to the peripheral surface of said cylinder. By the provision of these sides to the chute and their adaptation to the surface of the cylinder I am enabled to apply the glue to the surface of the cylinder in such a way as to form a pool of glue, so to speak, which extends from one side to the other of said cylinder and the bottom of which is formed by its surface.

I have ascertained that I secure the best results in the formation of the sheet by the application of the glue in the above-mentioned manner.

The molding or cooling cylinder proper is of the construction already explained in order to permit of the continuous passage or circulation through it of iced water or cooling fluid, and in Fig. 6 I have indicated a convenient device for establishing and maintaining such a circulation. This device is conveniently composed of a chamber C, water-tight at the bottom and adapted to contain ice, and of a pump D, adapted, through a suction-pipe $d$ leading out from the lower part of said chamber, to suck the iced water from said chamber and force it through the force-pipe $d'$ into one of the trunnions $b^3$ of the cooling-cylinder, through the cooling-chamber $b'$ of which it circulates, and through the other trunnion of which it is, after its circulation, forced into a discharge-pipe $d^2$ leading back to the ice-chamber.

The suction-pipe should start from the bottom of the lower portion of the ice-chamber. The discharge-pipe may deliver its contents either into the lower part of the ice-chamber, as shown, or above the ice.

The force-pipe into and the discharge-pipe from the cylinder make tight communication with the trunnions of said cylinder by the stuffing-boxes $d^\times$.

The pump may be of any preferred character. A drain-pipe $d^3$ should be provided for the escape of the surplus water as it accumulates from the melting of the ice.

The special construction of the cooling-cylinder described, and the means for occasioning the constant circulation of a fluid refrigerant through it while revolving, are set forth in my application referred to.

I do not limit myself either to the special construction of the cooling-cylinder above set forth, or to the special devices by which a refrigerant is caused to circulate through said cylinder, as other equivalent constructions may obviously be resorted to.

By the term "cylinder," moreover, as applied to the congealing-drum B, I include any prism or drum of polygonal cross-section wherewith the operation herein described would be possible of practice.

*The Preliminary Cooling of the Liquid Glue.*

Referring now to the operation of the preliminary cooling of the liquid glue, and to the devices illustrated by which said cooling may be conveniently performed, E and F, Fig. 3, respectively designate what I term the "cooling-drums," the same being typical of a device—for but one drum may be used—or series of devices by the aid of which, as a preliminary step, the heat may be measurably abstracted from the liquid glue, in order that when the glue comes to be delivered upon the surface of the cooling-cylinder it may be as low in temperature as possible.

Both of the drums are adapted to be rotated in fixed bearings $e$ and $f$, and are rotated by any preferred means, which I have not deemed it necessary to illustrate in the drawings.

Both drums are hollow and are mounted upon hollow axes, so that a fluid refrigerant can be introduced within them and caused to circulate through them. I find it convenient to introduce this refrigerant through the inlet-pipe $e^3$ first to the lower or second drum, and then to conduct it through the pipe $e^2$ to the upper or first drum, and then to lead it out of said upper or first drum through the outlet-pipe $e^\times$. The details of the pipe-fittings are unessential.

The upper drum operates in conjunction with the supply-chute $E^\times$, which is preferably hinged at its upper end, as at $e^4$, provided with side pieces $e^5$, which embrace the head of the drum, and also provided at its lower edge with a square edge or scraper $e^6$, which makes close contact with the periphery of the drum and serves to scrape the film of liquid glue delivered by the first supply-chute upon the surface of said drum from off said surface and permit its descent and deposit upon a second supply-chute $F^\times$ operative in connection with the second drum F.

In general detail the construction of the second supply-chute corresponds with that of the chute $E^\times$ described—that is to say, it bears a similar relation to its own drum, is hinged at $f^4$ at its upper end, and is provided with side pieces $f^5$ and with a scraper $f^6$.

Both chutes are as to their respective lower ends or scrapers maintained in contact with their respective drums conveniently by means of counterweights $f^\times$, operative through levers $f'$ and links $f^2$ to maintain the appropriate closure.

Other devices operative to the same purpose may obviously be substituted for these special appliances.

The liquid glue is shown as being delivered upon the breast of the upper supply-chute $E^\times$ from a feeding-trough $a^2$ of any preferred character, but preferably adapted to distribute the glue uniformly across the breadth of the chute.

In operation the cooling-drums are revolved at a speed superior to that of the cooling-cylinder, and, as indicated by the arrows, in the same direction, with the result that the drums take up the liquid glue and carry it around in an extremely-thin film, the film formed on the first drum being scraped off and descending upon and along the breast of the second chute to be taken up by the periphery of the second drum, and then scraped from off it and permitted to descend upon the breast of the inclined main chute $B^2$, at the base of which the glue accumulates and forms a pool, as already mentioned, out of which the sheet of jellied glue is picked up by the revolving periphery of the cooling or molding drum.

By introducing the refrigerant first to the lower drum it will be apparent that the colder water will act upon the cooler glue and the warmer water upon the hotter glue. This peculiarity of introduction, although not essential, is of advantage from considerations of economy, and is of course applicable when the series of drums exceed two. By providing any desired extent of drum-surface the glue may be cooled to any desired degree short of depriving it of fluidity.

The purpose of revolving the cooling-drums at a speed superior to that of the cooling-cylinder is to insure the taking up by the drums of but a thin film of glue, to the end that the thinner the film the more rapid may be the convection of the heat from the glue and the more efficient the drum-surface for cooling.

By regulating the supply and passage of the refrigerant through the drums the rate of cooling may be regulated at will.

I have not, as mentioned, deemed it necessary to illustrate any devices for actuating to their desired revolutions the drums or the cooling-cylinder. Any system of belting or train of gearing may be resorted to.

The Sheet-Delivering Mechanism.

G is a sheet carrying or delivering apron, which, in the organization illustrated, is the device that strips the sheet of jellied glue from off the peripheral surface of the molding-cylinder and delivers it to the cutting mechanism and to the drying-nets. This apron travels over a roller $g$ and a roller $g^\times$, either of which may be positively driven. The driving-roller is actuated in any preferred manner and preferably at a speed superior to that of the molding-cylinder. In fact, the surface of the apron, traveling at the speed of the driving-roller, constitutes a sheet-stripping mechanism of a character set forth and claimed in my pending application referred to. The apron may be formed either as a web or as a series of cords lying and traveling in parallel grooves formed in the rollers.

So far as a glue-sheet stripper *per se* is concerned, other devices than the apron G may be employed in conjunction with the other elements of my apparatus. When, however, the stripping-apron is employed, it is obvious that if it be constructed as a web of fabric of sufficient thickness its peripheral surface which is bent about the driving-roller $g$ will travel at a speed superior to that of the molding-cylinder even though the surface of the roller itself travels at the same speed.

At the commencement of the operation of the apparatus, when the cooling-cylinder has performed such sufficient revolution as to bring the advance edge of the jellied sheet of liquid glue upon its surface around to a point about opposite to the upper roller, an attendant, standing in a favorable position, reaches over the roller $g$, and while the apparatus continues in motion dexterously parts or detaches the advance edge of the sheet from the cooling-cylinder and overlays it upon the roller, the adhesion of the sheet to the surface of the roller being sufficient to occasion the initial stripping, which is thereafter continuous. In practice, the speed of the moving parts being under complete control, the apparatus is slowed down during the performance of the operation above referred to.

The Sheet-Cutting Mechanism.

The next step after the stripping of the sheet from the cylinder is its transverse division or cutting into sections of the length each of a drying-net, and the subsequent delivery of the divided sections *seriatim* upon said nets as they pass successively beneath the delivered divided sections.

I have in Fig. 4 represented a convenient form of cutting mechanism for dividing the sheet transversely, and also, in connection therewith, a convenient mechanism for occasioning the intermittent "speeding," or more rapid advance movement, of the nets to insure the appropriate delivery of a succeeding section upon a succeeding net after the severance and delivery of the preceding sections.

Assuming that the nets (strictly the net-frames and nets) represented in Fig. 4 are traveling in the direction of the arrow applied to them, and that the sheet-delivering apron is also traveling in the direction of the arrows applied to it, the sheet of glue $a'$ is led from off the apron through a transversely-extending fixed slotted "shears-guide" H, as I term it, the same being a guide device of any preferred construction, with relation to which the transversely-extending reciprocating shears-blade or cutter $h$ is caused to have intermittent longitudinal movement by being connected, for instance, through the rod $h^\times$, with a rocker-arm $h^2$, (shown as erected from a rock-shaft $h^3$,) the oscillation of which occasions its movement and also the throw of the rod and the action of the blade.

Normally the rocker-arm and shears-rod are retained in the position represented in Fig. 4 by a weighted lever $h^4$ fixed upon the rock-shaft and bearing when at rest upon the stop $h^5$.

The oscillatory movement of the shaft, which occasions the throw of the rocker-arm, the action of the shears, and the temporary lifting of the weighted lever, is conveniently occasioned by the encounter of the advance end of a moving drying-net with a rocker-foot $h^6$ keyed upon the rock-shaft and formed with an inclined under face or toe $h^7$, which the nets encounter.

Assuming the nets to be traveling at a uniform speed, and also that their lengths bear such proportionate relationship to the cutting mechanism and its operating devices as are represented in Fig. 4, it will be apparent that the division of the sheet by the shears at the point indicated in said figure, when accompanied by the continued advance of the sheet, would occasion the deposit of the advance extremity of the severed sheet upon that net, the lower extremity of which happened for the time being to be beneath the cutter, and that the result of this in the continued advance of the nets would be to lap the advance end of the sheet over the upright end bars or T's at the rear end of the first net and the front end of the succeeding net, a result to be, of course, guarded against. In order, therefore, to avoid this undesirable contingency, I provide for the intermittent acceleration of the speed of travel of the nets during the interval between the action of the cutter and the descent of the severed advance extremity of the sheet of glue to encounter with a net, and find it convenient to effectuate such result by resorting to the following contrivances, which are operative in association with the devices for actuating the cutting mechanism already described, and also with the devices for occasioning the traverse of the nets, which also it is appropriate to describe in connection therewith.

The Net-Conveying Mechanism or Conveyer-Ways.

I is what I term a "net-carrier shaft," the same being a shaft extending longitudinally of the apparatus and practically from end to end of it, as shown in Fig. 1, and adapted to be driven in a manner hereinafter mentioned. $i$ are a series of belt-driving pulleys applied to the aforesaid shaft near the feeding end of the apparatus, which, conveniently through belts $i^\times$, actuate a series of transversely-mounted net-carrying rollers $i^2$, equipped with belt-pulleys $i'$, Fig. 1, and disposed in any preferred manner—as, for instance, as shown in said Fig. 1—in connection with a pair of parallel fixed net conveying or conveyer ways $i^3$ extending longitudinally of the apparatus from elevator to elevator beneath the sheet-delivering apron and through the stripping-compartment.

I find it convenient, in the organization of a net-conveyer of the character specially illustrated, to apply a separate set of rollers to each of the ways, to deliver the net-frames directly upon the rollers, as indicated in Fig. 5 and hereinafter described, and to impart positive movement only to the first few rollers of the series and constitute the others as idlers, the positive driving of the first few nets of the series of applied nets causing them not only to advance the nets delivered upon them, but also to propel the nets happening to be ahead of them, end in contact with end, over the idle-rollers. As, however, the device described is typical merely of a net carrier or conveyer to occasion the traverse of the nets successively from one end of the apparatus to the other, it is obviously within the invention to substitute an endless traveling apron or a movable track, a set or sets of sprocket-chains, or other appropriate conveyer device, to serve the purpose of a net-carrier proper. It is therefore to be understood that I herein employ the term "conveyer-ways" to include net-conveying mechanism generically as such, whatever be its special construction.

The Traveling-Net Frames.

The net-frames J, which I prefer to use, are represented in Fig. 7, and are preferably formed of two lateral parallel angle-bars $j$, which form the sides of the frame, of two parallel T-bars $j^\times$, which form the ends of the frame, and of a central longitudinally-extending T-bar $j^2$, the arrangement being that represented in the drawings, and the vertical member of the angle side bars being innermost, the vertical members of the end T-bars projecting upward, the vertical member of the central T-bar projecting downward, and the outer ends of the end T-bars coinciding with the outer edges of the horizontal members of the angle side bars.

The connection of the bars to each other may be by rivets or otherwise, as may be preferred, and the glue-carrying surface of the frame may be composed of a web of woven wire $j^3$ applied in any preferred manner, the width of the frame being, in the apparatus represented, such as to cause the horizontal members of its side bars to rest upon the carrying-rollers $i^2$ already referred to.

It should be mentioned that I herein employ the word "net" to include both the web and frame.

Notches $j^4$ cut in the upwardly-projecting flanges of the end bars are adapted, in the stacking of the net-frames, to match into corresponding notches $j^5$ in the vertical downwardly-projecting members of the side bars, with the result that when the frames are stacked they are retained in fixed position and adequate and uniform interspaces for air are provided between them.

Certain of the frames are themselves provided with frame-rollers $j^6$, as shown, for instance, in Figs. 8, 9, 12 and 13, and these roller-provided frames are selected as the lowermost frames of the stacks, in order that the stacks may be easily rolled off and on the platforms of the elevator-rams.

The Mechanism for Intermittently Accelerating the Travel of the Nets.

The net-carrier shaft I, through which, as explained, the net-carrying conveyer-rollers $i^2$ are positively operated, is itself driven by the belt $i^4$, which passes over a pulley I' upon it, and also over a driven pulley $i^5$ on a counter-shaft I$^\times$, which is provided with two fixed tooth-gears $i^7$ and $i^8$ of different diameters, and respectively in constant engagement with a small gear $k$ on the driving-shaft K, and with a large gear $k^\times$ on a hollow sleeve $k'$ mounted upon said driving-shaft and adapted to be revolved thereon.

A pulley $k^2$, termed the "fast" pulley, is fixed upon the sleeve $k'$ and adapted to revolve said sleeve and its large gear $k^\times$. A second pulley $k^3$, termed the "slow" pulley, is fixed on the driving-shaft K and adapted to revolve said shaft and its gear $k$. Between the aforesaid pulleys a "loose" pulley $k^4$ is mounted upon the driving-shaft K.

A driving-belt $i^6$ from a source of power is adapted under the control of a belt-shifter $k^5$, connected with the rocker-arm $h^2$ already described, to run upon any one of the aforesaid pulleys, and it is obvious that when it is running on the slow pulley $k^3$ on the driving-shaft it will be driving said driving-shaft and the small gear $k$ on said shaft, with the result that, through the engagement of said gear $k$ with the large gear $i^7$ on the counter-shaft, the counter-shaft will be being driven, and will, through its belt $i^4$, be driving the net-carrier shaft I at a given slow rate of speed, calculated to be that requisite to impart the normal speed to the net-carrying motor-rollers $i^2$.

It is also obvious that when the driving-belt $i^6$ is shifted to run upon the fast pulley $k^2$ on the sleeve $k'$ said pulley and sleeve and the gear $k^\times$ on said sleeve will be revolving and the counter-shaft $I^\times$ will be being driven by its small gear $i^8$, or at a higher rate of speed than when the driving is through the train first mentioned.

Both trains of gearing are, of course, running when the driving-belt is upon either the fast or the slow pulley, and are at rest only when the driving-belt is upon the loose pulley.

It will be apparent that, in the normal position of the parts represented in Fig. 4, and before the action of the shears-blade, the rocker-arm and the belt-shifter will occupy such position that the driving-belt will be running on the slow pulley and the slow train will be being driven.

It will also be apparent that, in the advance of the nets, the encounter of the rear end bar of a given net-frame with the toe $h^7$ of the rocker-foot $h^6$ will occasion the lifting of said rocker-foot and the left-hand or forward throw of the rocker-arm $h^2$, with the result that, contemporaneously with the operation of the cutting mechanism by the advance of the shears-blade to sever the sheet, the driving-belt will be shifted to the fast pulley for the actuation of the fast train, and will thereby occasion the speeding of the net-carrier shaft and the sudden acceleration in the advance movement of the net-carrying rollers and nets, with the further result that the severed advance end of the sheet will, when the blade is retracted, be deposited upon the advanced net-frame succeeding that beneath the cutter at the time of cutting, and with the still further result that the instant the end bars (shown in Fig. 4 as beneath the rocker-foot) pass beyond said foot the action of the parts will be reversed, the shears-blade retracted, and the belt shifted back to the slow pulley for the continued normal slow advance of the nets.

*The Net-Lowering Mechanism.*

Having now described the devices by which the sheet of jellied glue is conveniently formed, cut to proper lengths, the lengths deposited separately upon nets, and the nets caused to advance, the next step, or that of the delivery of the nets from the conveyer-ways of the apparatus, is, preferably, to a lowering-elevator at the discharging end of said ways, upon the platform of which the nets are deposited one by one and stacked one on top of another, and from which the completed stacks are successively conveyed or delivered into a drying-room of any usual and well-known character and provided with appropriate blowers for drying the sheets, and with tracks and stack-carrying trucks or other handling devices.

I have not deemed it necessary to illustrate the drying-room in detail, the location of which is indicated by the dotted lines and words "drying-room" in Fig. 2, because I make no claim upon any feature connected with such room or the operation of drying as conducted therein.

The lowering-elevator at which the conveyer-ways terminate may be of any preferred construction. I find it convenient to constitute it as a horizontal track-provided platform L supported upon a vertically-movable plunger $l$ of a hydraulic ram of any preferred construction and typically illustrated by $l^\times$, Fig. 1.

A framework of four vertical posts $l^2$ at the corners of the platform may be arranged to serve as guides to the platform and to constitute an elevator-well.

*The Net-Stacking Mechanism.*

Assuming it possible to control the vertical movement and position of the platform L by any usual means, the nets, as successively delivered to the lowering-elevator, are to be deposited one after another upon its platform in a stack, the lowermost net-frame of which is a roller-provided frame. This "stacking" may be effected by many means. I prefer to resort to a device which I term a "stacker," and which is of the following construction: M, Fig. 11, is what I term a "stacker-head frame," the same conveniently being a rectangular horizontal framework adapted to be suspended conveniently, by means of rods $m$, from an operating rope, chain, or cable $m^\times$, which passes over suitable pulleys $m^2$, is provided with a counterweight $m^3$, as shown in Fig. 1, and is adapted to be raised or lowered either through the manual or the mechanically controlled operation of said rope. The stacker-head frame is disposed within the elevator-well above the elevator-platform and appropriately stayed and guided therein, and from it depend four carrying-rods $m^4$, which, at their lower extremities, by opposite pairs, are connected with or linked to transverse horizontal carrying-bars $m^5$, the extremities of which project slightly beyond their points of juncture with said rods and are entered within and guided by vertical grooves or guideways $l^3$ conveniently formed in plates $l^4$ applied and attached to the inner opposite faces of opposite pairs of the elevator-posts $l^2$, as shown in Figs. 8, 9, and 10. Each of these carrying-bars serves as the carrier and axis for what I term a "stacker-way frame," the same being conveniently formed as a rectangular frame, the inner members $m^6$ of said frames together constituting the stacker-ways proper, upon which the net-frames are successively deposited, and the outer members being constituted by counterweight-bars $m^7$, framed to the stacker-ways $m^6$ by cross-bars $m^8$, as shown in Figs. 10 and 11, and serving to balance the weight of a net-frame when upon the stacker-ways and to maintain the horizontal equilibrium, so to speak, represented in Fig. 8.

The stacker-way frames, which, as shown, are opposite counterparts, are adapted to be raised and lowered with the stacker-head frame M, and such is the balance of each of these frames, the counterweight-bars being heavier than the stacker-ways, that, excepting the period during which they are supporting a net-frame, the stacker-way frames normally occupy the inclined positions represented in dotted lines in Fig. 8. In the ascent, however, of the stacker as an entirety from the position indicated in Fig. 8 to that indicated in Fig. 9, or the initial position in which the stacker is placed in order to receive a net, the stacker-ways $m^6$ are deflected by inclined guideways $l^6$ formed in the plates $l^4$ until they encounter stops $l^5$, whereupon the stacker-way frames come to rest in a horizontal position at the top of the guideways, as indicated in Fig. 9. Assuming that in this position of the stacker-ways a net-frame is pushed off the conveyer-ways and received upon them, and assuming, further, that the platform L is elevated to a desired height—for instance, that represented in Fig. 8—in which the descent of the stacker with the net-frames upon it is indicated by the arrow, the frame, if not the first one to be lowered, will be lowered until it is deposited upon the frame previously lowered, and as soon as it comes to rest on top of said frame the further-continued descent of the stacker will permit of the tilting downward and outward of the counterweight-bars of the stacker-way frames until said frames assume the positions indicated in dotted lines in Fig. 8, and clear the net-frame which they have last carried, so as to be free from it to permit of the immediate elevation of the stacker to the first position, or that represented in Fig. 9. As, however, the operation of the lowering-elevator must be practically continuous and its platform be constantly operated to descend with a given stack to be delivered to the drying-room and to then ascend for a succeeding stack, it is obvious that provision must be made for temporarily maintaining a series of nets independently of the platform as they are being deposited one after another and formed into a stack. This is conveniently accomplished by the application of a set of double-angled pivoted latches N, Figs. 8 and 9, which normally occupy the position represented in Fig. 8 and serve to take beneath the lowermost net of the stack, but which, when a given stack has been formed and the platform rises to receive it and carry it down, are adapted to be deflected by encounter with the rising platform outwardly about their pivots into the positions indicated in dotted lines in Fig. 9, which positions, by reverse encounter with the sides of the descending nets, they maintain until the stack has descended past them, whereupon they gravitate into their first position, as in Fig. 8, and remain in range to receive and support the first net of the next succeeding stack then being formed by the stacker.

Upon the next ascent of the platform the latches are again deflected clear of the stack then upon them, which, like the preceding stack referred to, is picked up by the elevator-platform and carried down to the level of the floor of the drying-room. The stops $l^5$, which limit the upward movement of the stacker-ways, are preferably located at a distance not less than the depth of a wheeled net-frame below the level of the conveyer-ways, and from this relationship of levels it is obvious that as a particular net is pushed off the conveyer-ways it will fall upon the stacker-ways and descend to such a level that the forward end of the next frame will be free to pass over it without intermission. As the stacker descends with the frame, for the time being deposited upon its ways, it is, of course, necessary to prevent the succeeding frame as it is progressively pushed off the conveyer-ways from falling down the elevator-well before the stacker has been elevated again to its first position to receive it, and such happening I conveniently guard against by providing near the ends of the conveyer-ways overhanging guard-plates $i^9$, Fig. 1, which overhang the sides of the nets and serve to prevent each in turn from tipping over and falling during the period of the descent and ascent of the stacker and before the stacker has again been elevated into its receiving position.

When the platform is elevated to receive a stack, its limit of upward movement is determined by stops $l^8$ in the posts of the well, as shown in Fig. 8. As the stack is carried down to the level of the drying-room floor by the platform of the lowering-elevator, it is transferred from the platform and led off over the ways $l^7$, Fig. 2, and the sheets subjected to the usual operation of drying within said room.

The Net-Elevating Mechanism.

When the sheets of a stack have been dried, the stack is transferred in any preferred manner, conveniently along the ways $l^9$, Fig. 2, and transferred to an elevator which I term the "lifting" elevator, upon the platform O of which the stack is deposited for the return of the nets to the ways.

The lifting-elevator is, as shown in Figs. 1 and 2, preferably located at the feeding end of the conveyer-ways of the apparatus, which commence at said elevator. Its construction is, conveniently, similar to that of the lowering-elevator, and its horizontal preferably track-provided platform O is conveniently supported upon a vertically-movable plunger $o'$ of a hydraulic ram of any preferred construction, and such, for instance, as is typically illustrated by $o^\times$ in Fig. 1. A framework of four vertical posts $o^2$ at the corners of the platform may, similarly, be arranged to serve as guides to the platform and to constitute an elevator-well.

Assuming it possible to control by any usual means the vertical movement and position of the platform O, said platform, in the operation of depositing the nets upon the conveyer-ways, is first lowered to the level of the floor of the drying-room and a stack of nets deposited upon it. As soon as this has been done the net-frames with the dried sheets upon them are removed one by one and deposited upon the conveyer-ways.

The Net-Lifting Mechanism.

The lifting of the net-frames or the "unstacking" of the stack, and the removal and placing of one net-frame after another upon the conveyer-ways, may be effected by many means. I prefer to resort to the following contrivances to effect the operation: Within the wall of the lifting-elevator is suspended and appropriately stayed and guided a quadrangular frame, similar to the stacker-head frame already described in connection with the lowering-elevator, which I term the "lifter" head-frame P. This frame is simply a horizontal framework, suspended conveniently by means of suspending-rods from an operating rope, chain, or cable $p^\times$, which passes over suitable pulleys $p^2$, is provided with a counterweight $p^3$, as shown in Fig. 1, and is adapted to be raised or lowered either through the manual or the mechanically controlled operation of said rope.

The lifter-head frame is, as shown in Figs. 1, 12 and 13, disposed within the elevator-well, and from each of its corners depends a hook-bar $P^\times$, pivoted to it at $p'$. Each of these bars terminates at its bottom in a hook $p^4$ having a net-receiving shoulder $p^5$, upon which the horizontal member of the side bar of a net-frame is adapted to rest in the operation of lifting a frame. The four hook-bars are arranged in parallel opposite pairs or in such manner that the hooks of the two or pair of bars upon one side of the well shall face inward in the same direction and oppositely to the hooks of the two or pair of bars upon the other side of the well, which similarly face inward and toward them. Each of the hook-bars is provided with a flat spring $p^6$ adapted to bear and travel against a fixed vertical guide $o^3$ conveniently projecting from and applied to one of the posts $o^2$. In the up-and-down movement of the hook-bars these springs serve, in conjunction with suitable resisting fixed guides $o^4$ upon the posts, against which the bars are pressed by the springs, to maintain said bars in the vertical positions represented in Figs. 12 and 13, but are adapted to yield and permit the moving or spreading apart of the hook-bars when it is desired to move the bars of opposite pairs correspondingly away from each other to permit of their clearing a net-frame, as hereinafter described. It will now be understood that the lifter-head frame and its set of hook-bars are the devices which serve to "unstack" or lift each net in turn from the stack upon the platform of the lifting-elevator, and to place such net in position to be delivered upon the conveyer-ways.

The engagement of the hooks with the upper net-frame of a stack upon the lifting-platform is effected as the hook-bars in the descent of the lifting-head frame encounter said net-frame, the oppositely-inclined lower faces $p^7$ of the hooks encountering the side bars of the frame and being by them deflected outwardly, and the springs $p^6$ being compressed until the shoulders $p^5$ of the hooks reach the level of the under surface of the frame, when the springs reacting occasion the engagement of the hooks beneath the frame in the position shown in Fig. 12, in which position the hook-bars remain during the ascent of their lifting-head frame to the level of the conveyer-ways.

The Net-Delivering Mechanism.

When a net has been elevated to the level referred to, the next operation is to effect its removal from engagement with the hooks and its movement onto the conveyer-ways, to accomplish which I resort to a mechanism which I term the "starter-ways," and which may conveniently be of the following construction:

Q, Figs. 12, 13, 14, and 15, designate roller-housings which serve each to house and afford a bearing for a starter-roll $q$. There are four of these housings so fixedly connected in opposite pairs by connecting or yoke bars, which I term the "deflecting-bars" $q^\times$, that the adjacent parallel housings of a given connected pair and the starter-rolls that they carry normally bear to each other, to the elevator-well, and to the net-carrying driving-rollers $i^2$ of the conveyer-ways the relation represented in Figs 12 and 14 of the drawings—that is to say, in the normal position of the housings and starter-rolls or that represented in said figures the starter-rolls of each pair of housings are aligned with the net-carrying rollers $i^2$ of one of the conveyer-ways $i^3$. Each pair of the roller-housings and their respective connecting-bars $q^\times$ are conveniently fixedly suspended upon a common horizontal plane by the preferably resilient suspending-rods $q^5$, two of which are shown as applied in connection with each pair of housings, which are located at the sides of the elevator-well and which extend upward to points of fixed attachment conveniently near the top of the well. The function of these rods is not only that of suspending at a desired fixed height within the well the roller-housings, starter-rolls, and connecting-bars, which together constitute the starter-ways, but also that of permitting each pair of said connected housings, the starter-rolls which they carry, and the deflecting-bar which connects them to be sprung or moved away from their opposite counterpart neighbors, as shown in Fig. 13, in order to permit of the temporary clearance of the starter-rolls out of the path of the net-frames in the successive elevation of the latter through the elevator-well, and to subsequently permit of the return of the said devices to their normal position represented in Fig. 12 to be in readiness to receive a succeeding net-frame. The means by which this opposite in-and-out movement of the devices composing the starter-ways is conveniently effected is hereinafter described. Assuming now that a net-frame has been deposited upon the starter-rolls, it is manifest that if the latter be caused to revolve toward the conveyer-ways the net-frame will be caused to travel from off said starter-rolls and onto the rollers of the conveyer-ways. This requisite rotation of the starter-rolls may be variously brought about, but is conveniently accomplished by mounting each roll upon an axle $q'$ journaled in a housing Q and provided with a pulley $q^2$ adapted to be driven by a belt $q^3$ from a driving-pulley $q^4$, Fig. 1, a pair of which, operative in conjunction with a given pair of starter-rolls, may be conveniently mounted upon the net-carrier shaft I, and another pair of which, operative in conjunction with the other pair of starter-rolls, may, if desired, be mounted upon a counter-shaft geared from said net-carrier shaft.

Both or either pair of driving-pulleys may be otherwise mounted and driven.

In the normal position of the starter-ways, or that shown in Figs. 12 and 14, the starter-rolls project, as already mentioned, into the well and block the path of a net being elevated by the hooks. It is, of course, necessary that they should occupy this position in order that the starter-rolls of each pair may be sufficiently near together to support a net-frame deposited upon them. The necessary opposite deflection or movement of each pair of starter-rolls away from the other to permit, during the period of the deflection, of the passage of a net-frame to above the normal level of said rolls may be done in many ways, but is conveniently accomplished by the following means:

I have explained in what manner the suspension of the assembled devices composing each starter-way upon the rods $q^5$, by virtue of the resiliency of said rods, permits of the movement of the starter-ways from the normal position shown in Fig. 12 to that shown in Fig. 13, and this spreading-apart movement is conveniently effected by forming the connecting-bars $q^\times$ of the housings each with an outwardly and oppositely inclined lower deflecting-surface $q^6$, respectively adapted in the rise of the lifting-head frame and its hook-bars to be encountered by the upper inclined surface $r$ of a deflecting-lug R, one of which is formed upon or applied to each of the hooks $p^4$ of the hook-bars below the net-carrying shoulders $p^5$, as shown in Figs. 12, 13, and 15. Obviously in the rise of the hook-bars supporting a net, no inward movement of said hook-bars being possible, the encounter of the inclined upper surfaces of the deflecting-lugs of said bars with the lower deflecting-surfaces of the connecting-bars $q^\times$ will, as indicated in Fig. 13, occasion the outward opposite movement of the starter-ways until the lugs R have passed above the deflecting-bars, whereupon the resilient suspending-rods $q^5$, the comparative resilience of which may be measurably increased by stops $q^7$ in the elevator-well, will cause the return of said starter-ways to the position indicated in Fig. 12.

During the period in which the starter-ways are spread apart a net-frame is elevated above them, and when said starter-ways close up again their rollers will be beneath said frame to support it when released from the grasp of the hook-bars. This release of the hooks of the hook-bars from engagement with an elevated net-frame, necessary to permit of the descent of said bars and their lifting head-frame for engagement with and the lifting of a succeeding net-frame, is conveniently accomplished by providing the connecting-bars $q^\times$ with upper oppositely and inwardly inclined deflecting-surfaces $q^8$, which are adapted when the lugs R of the hooks have passed above said bars and the starter-ways have moved into their normal position to be respectively encountered by oppositely-inclined surfaces $r^\times$ formed on the lower faces of the deflecting-lugs of the hooks, and which in the descent of the hook-bars serve to spread said bars by opposite pairs outwardly away from each other until their shoulders have cleared from beneath the side bars of the elevated net-frame, and have passed downwardly and outside of said deflecting-bars, whereupon the springs $p^6$, compressed while said bars were spread apart, react to throw the bars inward to the normal position shown in Fig. 12, in which position, in their further descent, the inclined terminal faces $p^7$ of their hooks are once more adapted to encounter the sides of the succeeding net-frame for outward deflection and consequent engagement of said hook-bars with said frame.

In the operation of lifting the nets of a given stack to deposit them upon the conveyer-ways, it is convenient from time to time to raise the platform of the lifting-elevator a certain distance, in order to bring the nets then remaining upon it higher up and nearer to the lifting mechanism, or, in other words, to keep the top of the stack at a convenient height.

Net-Retarding Devices.

When by the operation of the devices described a net has been elevated from the platform of the lifting-elevator, deposited upon the starter-ways, and delivered by said ways upon the conveyer-ways, its travel along said last-named ways is, as stated, conveniently occasioned by the movement of the rollers $i^2$, the same being positively-driven rollers, typical, as explained, of a net-conveyer device, which cause it to travel at a predetermined speed up to a point in advance of the stripping-room T, at which I find it convenient to locate a retarding device, conveniently composed of a pair of pressure-rollers S, Figs. 1 and 2, to slow down its further movement. These rollers are mounted in any preferred manner with their axes vertical, and the shaft $s$ of one of them may be driven through a miter-gear $s^\times$, actuated in any preferred manner, conveniently by a belt-driving device $s^2$ from the net-carrier shaft, as shown in Fig. 1.

If desired, I may employ more than one pair of these pressure-rollers to regulate the travel of the nets; but I find it sufficient to employ a single pair so disposed and adapted, when revolved toward each other, as to bite upon the web of the central T-bar $j^2$ of the net for the time being passing over them. These rollers are driven at a peripheral speed considerably less than that of the net-carrying rollers, in order that as they engage with the successively-passing nets they may retard the advance of said nets during their passage through the stripping-room and to and beneath the cooling-cylinder. This retardation causes the net-frames, as successively delivered from the lifting-elevator, to make end-for-end contact with each other and, under the impulse of the nets acted upon by the driven carrying-rollers, to be propelled in an uninterrupted series.

It is obvious, as already briefly mentioned, that the above-described desired initial speed and subsequent retardation of the nets in their travel from the lifting to the lowering elevator may be accomplished by other means than the net-carrying rollers and pressure or retarding rollers. Thus, for instance, the conveyer-ways may be constituted by two sets of parallel pairs of endless sprocket-chains caused to travel in the same direction, but at different speeds, a fast-running proximate set of said chains constituting the ways between the lifting-elevator and the stripping-room, and a more-slowly running distant set of said chains constituting the remaining length of said ways.

The Stripping-Room.

The stripping-room T, Figs. 1, 2, and 5, may be of any preferred construction, but is disposed between the lifting-elevator and the cooling-cylinder. It is the compartment within which the glue in the brittle state in which it is brought upon the nets from the drying-room is subjected while still upon said nets and in transit to the operation of "stripping," so called, or beating with flexible rawhide whips which serve to shiver the dried sheet to fragments, and permit of its being, as so shattered, blown off the nets, and discharged from the compartment, leaving the net-frames empty to continue their travel along the conveyer-ways to receive further fresh sheets of jelly.

I have in the figures referred to represented a convenient construction of the stripping-room in which its lower portion is made convergent, to form a discharging-hopper $t$ with a central outlet through which the glue as stripped from the net is discharged by gravitation.

The conveyer-ways, as will be apparent from an examination of Fig. 5, pass completely through the stripping-room from end to end, horizontal openings $t^\times$ in its end walls permitting of the travel of the nets into, across, and out of the room.

Along one side of the room is conveniently erected a platform $t^2$, upon which the operatives stand and beat with whips the glue upon the nets. Above and in front of this platform and along the side of the room upon which it is erected is a longitudinally-extending blast-pipe $t^3$, provided either with a series of horizontally-disposed inwardly-facing discharge apertures or nozzles, or with a continuous slot the range of which is such as to cause the blast or blasts of air forced, conveniently by a blower $t^4$, at high velocity from out said pipe to act directly upon the dried and fractured glue upon the net-frames transversely to their line of travel, so as to effectually blow it off. After the empty net-frames have passed out of the stripping-room, they continue upon their course along the conveyer-ways and beneath the cooling-cylinder to be once more supplied with sheets of jellied glue and to be subjected to the operations already at length recited.

Having now described my preferred method of manufacturing glue of commerce, by which the liquid glue is subjected to a preliminary operation of cooling before it is congealed into a sheet of jelly and dried and finally broken up, and also the assembled instrumentalities which together compose my apparatus in its entirety, it is proper to add that I do not restrict myself to the specific individual instrumentalities detailed, because, so far as my apparatus considered as an assemblage of separate but co-operating instrumentalities is concerned, it is obvious that other instrumentalities operative in the same assemblage, in a similar manner, and to the same result can be substituted for the particular instrumentalities represented and described. This I have endeavored to make clear throughout this specification when de- scribing the specific component elements of the apparatus represented in the drawings; but I now repeat that while I prefer, for instance, to employ the preliminary cooling-drum device the cooling-cylinder, the sheet-delivering apron, the sheet-cutting mechanism, the net-frames, the conveyer-ways, the means for actuating said ways, the lowering-elevator, the "stacker" operative in conjunction therewith, the lifting-elevator, and the net-lifting mechanism and net-delivering mechanism operative in conjunction with it, represented in the drawings, I yet reserve the right to substitute in the same assemblage other mechanically different but similarly operative elements in their stead.

It is also obvious that, if desired, the drying-room instead of being located at a lower level than the conveyer-ways may be erected upon a higher level, in which event, in addition to the special mechanisms shown, any suitable platform-elevators for lifting the stacks of undried glue and lowering the stacks of dried glue may be employed.

Having thus described my invention, I claim and desire to secure by Letters Patent—

1. The method of manufacturing glue, which consists:—first, in subjecting the liquid glue to an operation of congelation into a sheet of jelly,—second, in depositing the sheet of jelly upon a traveling net and drying it thereupon,—and, third, in fracturing the dried sheet of glue upon the net while in transit,—substantially as set forth.

2. The method of manufacturing glue, which consists:—first, in subjecting liquid glue to an operation of congelation into a sheet of jelly,—second, in depositing the sheet of jelly upon a traveling net and drying it thereupon,—third, in fracturing the dried sheet of glue upon the traveling net while in transit,—and, fourth, in removing the fractured particles from the net while in transit,—substantially as and for the purpose set forth.

3. The method of removing dried glue from a carrying net, which consists, first, in fracturing the glue upon the net by beating it, and, second, in blowing the beaten and fractured particles from the net,—substantially as and for the purpose set forth.

4. In an apparatus for the manufacture of glue, the following elements in combination:—a feed for liquid glue,—a glue-cooling device which subjects the liquid glue to an operation of preliminary cooling,—a revoluble cooling cylinder upon the surface of which the cooled glue is delivered and formed into a sheet of jelly,—means for maintaining the surface of the cooling cylinder cold,—a sheet-delivering mechanism for stripping the sheet of jelly from the surface of the cooling cylinder,—a cutting mechanism for dividing the sheet transversely into sections,—and a net-conveying mechanism for occasioning the passage of nets beneath the cutting mechanism,—substantially as set forth.

5. In an apparatus for the manufacture of glue, the following elements in combination:—a feed for liquid glue,—a revoluble cooling cylinder upon the surface of which the liquid glue is delivered and congealed into a sheet of jelly,—means for maintaining the surface of the cooling cylinder cold,—a sheet-delivering mechanism for stripping the sheet of jelly from the surface of the cooling cylinder,—a cutting mechanism for dividing the sheet transversely into sections,—a net-conveying mechanism for occasioning the passage of nets beneath the cutting mechanism,—a net lowering mechanism operative in conjunction with said net-conveying mechanism,—and a net-lifting mechanism also operative in conjunction with said net-conveying mechanism, substantially as set forth.

6. In an apparatus for the manufacture of glue, the following elements in combination:—a feed for liquid glue,—a glue-cooling device which subjects the liquid glue to an operation of preliminary cooling,—a revoluble cooling cylinder upon the surface of which the cooled glue is delivered and formed into a sheet of jelly,—means for maintaining the surface of the cooling cylinder cold,—a sheet-delivering mechanism for stripping the sheet of jelly from the surface of the cooling cylinder,—a cutting mechanism for dividing the sheet transversely into sections,—a net-conveying mechanism for occasioning the passage of nets beneath the cutting mechanism,—a net-lowering mechanism operative in conjunction with said net-conveying mechanism,—and a net-lifting mechanism also operative in conjunction with said net-conveying mechanism,—substantially as set forth.

7. In an apparatus for the manufacture of glue, the following elements in combination:—a feed for liquid glue,—a revoluble cooling cylinder upon the surface of which the liquid glue is delivered and congealed into a sheet of jelly,—means for maintaining the surface of the cooling cylinder cold,—a sheet-delivering mechanism for stripping the sheet of jelly from the surface of the cooling cylinder,—a cutting mechanism for dividing the sheet transversely into sections,—a net-conveying mechanism for occasioning the passage of nets beneath the cutting mechanism,—a net-lowering mechanism operative in conjunction with said net-conveying mechanism,—a net-lifting mechanism also operative in conjunction with said net-conveying mechanism,—and a drying room in conjunction with which both the net-lowering and the net-lifting mechanisms operate,—substantially as set forth.

8. In an apparatus for the manufacture of glue, the following elements in combination:—a feed for liquid glue,—a glue-cooling device which subjects the liquid glue to an operation of preliminary cooling,—a revoluble cooling cylinder upon the surface of which the cooled glue is delivered and formed into a sheet of jelly,—means for maintaining the surface of the cooling cylinder cold,—a sheet-delivering mechanism for stripping the sheet of jelly from the surface of the cooling cylinder,—a cutting mechanism for dividing the sheet transversely into sections,—a net-conveying mechanism for occasioning the passage of nets beneath the cutting mechanism,—a net-lowering mechanism operative in conjunction with said net-conveying mechanism,—a net-lifting mechanism also operative in conjunction with said net-conveying mechanism,—and a drying room in conjunction with which both the net-lowering and the net-lifting mechanisms operate,—substantially as set forth.

9. In an apparatus for the manufacture of glue, the following elements in combination:—a feed for liquid glue,—a revoluble cooling cylinder upon the surface of which the liquid glue is delivered and congealed into a sheet of jelly,—means for maintaining the surface of the cooling cylinder cold,—a sheet-delivering mechanism for stripping the sheet of jelly from the surface of the cooling cylinder,—a cutting mechanism for dividing the sheet transversely into sections,—a net-conveying mechanism for occasioning the passage of nets beneath the cutting mechanism,—a net-lowering mechanism operative in conjunction with said net-conveying mechanism,—a net-lifting mechanism also operative in conjunction with said net-conveying mechanism,—a drying room in conjunction with which both the net-lowering and the net-lifting mechanisms operate,—and a stripping room in advance of the cooling cylinder through which the net-conveying mechanism passes,—substantially as set forth.

10. In an apparatus for the manufacture of glue, the following elements in combination:—a feed for liquid glue,—a glue-cooling device which subjects the liquid glue to an operation of preliminary cooling,—a revoluble cooling cylinder upon the surface of which the cooled glue is delivered and formed into a sheet of jelly,—means for maintaining the surface of the cooling cylinder cold,—a sheet delivering mechanism for stripping the sheet of jelly from the surface of the cooling cylinder,—a cutting mechanism for dividing the sheet transversely into sections,—a net-conveying mechanism for occasioning the passage of nets beneath the cutting mechanism,—a net-lowering mechanism operative in conjunction with said net-conveying mechanism,—a net-lifting mechanism also operative in conjunction with said net-conveying mechanism,—a drying room in conjunction with which both the net-lowering and the net-lifting mechanisms operate,—and a stripping room in advance of the cooling cylinder through which the net-conveying mechanism passes,—substantially as set forth.

11. In an apparatus for the manufacture of glue, the following elements in combination:—net-conveying mechanism which occasions the travel from one point to another of glue-carrying nets,—net-lifting mechanism for lifting the nets one by one from the top of a stack and which is operative in conjunction with said net-conveying mechanism to supply it with nets,—net-lowering mechanism also operative in conjunction with said net-conveying mechanism to deliver from it the nets,—and means for supplying the nets with sheets of glue,—substantially as set forth.

12. In an apparatus for the manufacture of glue, the following elements in combination:—a feed for liquid glue,—a glue-cooling device which subjects the liquid glue to an operation of preliminary cooling,—a revoluble cooling cylinder upon the surface of which the cooled glue is delivered and congealed into a sheet of jelly, and through which a fluid refrigerant is caused to circulate,—a surface which travels at a speed superior to that of the peripheral surface of the cylinder and strips the sheet from said cylinder,—cutting mechanism for dividing the sheet transversely into sections,—and traveling nets for carrying off said sections,—substantially as and for the purpose set forth.

13. In an apparatus for the manufacture of glue, the following elements in combination:—a feed for liquid glue,—a series of revoluble glue-cooling drums through which a fluid refrigerant is caused to circulate, and upon the surfaces of which the glue is successively delivered,—a revoluble cooling cylinder upon the surface of which the cooled glue is delivered and congealed into a sheet of jelly, and through which a fluid refrigerant is caused to circulate,—and a sheet-delivering mechanism for stripping the sheet of jelly from the surface of the cooling cylinder,—substantially as and for the purpose set forth.

14. In an apparatus for the manufacture of glue, the following elements in combination,—a feed for liquid glue,—a series of revoluble glue-cooling drums through which a fluid refrigerant is caused to circulate, and upon the surfaces of which the liquid glue is successively delivered,—a revoluble cooling cylinder upon the surface of which the cooled glue is delivered and congealed into a sheet of jelly, and through which a fluid refrigerant is caused to circulate,—a sheet-delivering mechanism for stripping the sheet of jelly from the surface of the cooling cylinder,—cutting mechanism for dividing the sheet transversely into sections, —and traveling nets for carrying off said sections,—substantially as and for the purpose set forth.

15. In an apparatus for the manufacture of glue the following elements in combination:—a feed for liquid glue,—a revoluble cooling cylinder upon the surface of which the liquid glue is delivered and congealed into a sheet of jelly,—and net-conveying mechanism which occasions the travel of the glue-carrying nets toward and beneath the cylinder first at a faster initial speed and then at a slower terminal speed,—to the end that spaces occurring between the nets as they are started on their travel may be closed up by the overtaking of the more slowly traveling nets by the faster ones,—substantially as set forth.

16. In an apparatus for the manufacture of glue, the following elements in combination:—conveyer-ways for transporting glue-carrying nets,—a lowering elevator at one end of said ways for lowering the nets,—a net-stacking mechanism which stacks the nets one by one on top of each other and operates in conjunction with said elevator,—and sheet-delivering mechanism located above the conveyer-ways for delivering sheets of glue to the nets in transit along the ways,—substantially as set forth.

17. In an apparatus for the manufacture of glue, the following elements in combination:—conveyer-ways for transporting glue-carrying nets,—a lifting elevator at one end of said ways,—a net-lifting mechanism which lifts the nets one by one from the top of a stack and operates in conjunction with said elevator,—and sheet-delivering mechanism located above the conveyer-ways for delivering sheets of glue to the nets in transit along the ways,—substantially as set forth.

18. In an apparatus for the manufacture of glue, the following elements in combination:—conveyer-ways for transporting glue-carrying nets,—a lifting elevator at one end of said ways for lifting nets,—a net-delivering mechanism which operates in conjunction with said elevator to deliver the nets from the top of a stack one by one,—and sheet-delivering mechanism located above the conveyer-ways for delivering sheets of glue to the nets in transit along the ways,—substantially as set forth.

19. In an apparatus for the manufacture of glue, the following elements in combination:—conveyer-ways for transporting glue-carrying nets,—a lifting elevator at one end of said ways,—a net-lifting mechanism which lifts the nets one by one from the top of a stack and operates in conjunction with said elevator,—a net-delivering mechanism which operates in conjunction with said net-lifting mechanism to deliver the nets one by one to the ways,—and sheet-delivering mechanism located above the conveyer-ways for delivering sheets of glue to the nets in transit along the ways,—substantially as set forth.

20. In an apparatus for the manufacture of glue, the following elements in combination:—conveyer-ways for transporting glue-carrying nets,—a lifting elevator at one end of said ways for lifting nets,—a net-delivering mechanism which operates in conjunction with said lifting elevator to deliver the nets from the top of a stack one by one,—a lowering elevator at the other end of said ways for lowering the nets,—and a net-stacking mechanism which stacks the nets and operates in conjunction with said lowering elevator,—substantially as set forth.

21. In an apparatus for the manufacture of glue, the following elements in combination:—conveyer ways for transporting glue-carrying-nets,—a lifting elevator at one end of said ways for lifting nets,—a net-lifting mechanism which lifts the nets one by one from the top of a stack and operates in conjunction with said elevator,—a net-delivering mechanism which operates in conjunction with said net-lifting mechanism to deliver the nets one by one,—a lowering elevator at the other end of said ways for lowering the nets from them,—a net-stacking mechanism which stacks the nets one by one on the top of a stack and operates in conjunction with said lowering elevator,—and sheet-delivering mechanism located above the conveyer-ways for delivering sheets of glue to the nets in transit between the elevators along the ways,—substantially as set forth.

22. In an apparatus for the manufacture of glue, the following elements in combination:—conveyer-ways for transporting glue-carrying nets,—a lifting elevator at one end of said ways for lifting nets,—a net-delivering mechanism which operates in conjunction with said lifting elevator to deliver the nets one by one,—a lowering elevator at the other end of said ways for lowering the nets,—a net-stacking mechanism which stacks the nets and operates in conjunction with said lowering elevator,—sheet-delivering mechanism located above the conveyer ways for delivering sheets of glue to the nets in transit between the elevators along the ways,—and a stripping room in advance of said sheet-delivering mechanism, through which said ways pass,—substantially as set forth.

23. In an apparatus for the manufacture of glue, in combination with conveyer-ways for transporting glue-carrying nets, and with a lowering elevator at one end of said ways for lowering the nets,—a net-stacking mechanism which stacks the nets and operates in conjunction with said elevator, and which is composed of the following elements in combination:—namely, the stacker head-frame, the carrying-rods, the stacker way-frames, means for raising and lowering the aforesaid devices, and guide-ways for guiding the stacker way-frames in their vertical traverse and for deflecting them into a horizontal plane,—substantially as and for the purpose specified.

24. In an apparatus for the manufacture of glue, in combination with conveyer-ways for transporting glue-carrying nets, with a lowering elevator at one end of said ways for lowering the nets, and with pivoted latches for supporting the nets during the operation of stacking, a net-stacking mechanism which stacks the nets and operates in conjunction with said elevator, and which is composed of the following elements in combination:— namely, the stacker head-frame, the carrying-rods, the stacker way-frames, means for raising and lowering the aforesaid devices, and guide-ways for guiding the stacker way-frames in their vertical traverse and for deflecting them in a horizontal plane,—substantially as and for the purpose specified.

25. In an apparatus for the manufacture of glue, in combination with conveyer-ways for transporting glue-carrying nets, and with a lifting elevator at one end of said ways for lifting the nets,—a net-lifting mechanism which operates in conjunction with said elevator to lift the nets one by one, and which is composed of the following elements in combination:—namely, the lifter head-frame, the spring-provided hook bars, means for raising and lowering the aforesaid devices, and guideways for limiting the spring movement of the hook bars,—substantially as and for the purpose specified.

26. In an apparatus for the manufacture of glue, in combination with conveyer-ways for transporting glue-carrying nets, and with a lifting elevator at one end of said ways for lifting the nets,—a net-delivering mechanism which operates in conjunction with said lifting elevator to deliver the nets one by one to the conveyer ways, and which is composed of the following elements in combination:—namely, two oppositely-disposed pairs of connected roller-housings adapted to be moved from and toward each other and provided with starter-rolls, means for operating said starter-rolls, and devices, essentially such as set forth, for occasioning the mutual approach and recession of said pairs of roller-housings and starter-rolls,—substantially as and for the purpose specified.

27. In an apparatus for the manufacture of glue, in combination with conveyer-ways for transporting glue-carrying nets, and with a lifting elevator at one end of said ways for lifting the nets;—first, a net-lifting mechanism which operates in conjunction with said elevator to lift the nets one by one, and which is composed of the following elements in combination:—namely, the lifter head-frame, the spring-provided hook bars, means for raising and lowering the aforesaid devices, and guideways for limiting the spring movement of the hook-bars;—and, second, a net-delivering mechanism which operates in conjunction with said lifting elevator to deliver the nets one by one to the conveyer-ways, and which is composed of the following elements in combination:—namely, two oppositely-disposed pairs of connected roller-housings adapted to be moved from and toward each other and provided with starter-rolls, and devices, essentially such as set forth, for occasioning the mutual approach and recession of said pairs of roller-housings and starter-rolls,—substantially as set forth.

28. In an apparatus for the manufacture of glue, the following elements in combination:—conveyer-ways for transporting glue-carrying nets,—net-retarding pressure rolls for regulating the speed of travel of the nets,—means for rotating said pressure rolls,—and glue-carrying nets the frames of which are provided with longitudinally extending flanges adapted to be engaged by the pressure rolls,—substantially as set forth.

29. In an apparatus for the manufacture of glue, the following elements in combination:—a feed for liquid glue,—a revoluble cooling cylinder upon the surface of which the liquid glue is delivered and congealed into a sheet of jelly,—a sheet-delivering mechanism for stripping the sheet of jelly from the surface of the cooling cylinder,—a cutting mechanism for dividing the sheet transversely into sections,—conveyer-ways along which nets for carrying the divided sheets are caused to travel,—and mechanism combined with and occasioning the operation of the cutting mechanism, which is itself intermittently operated by contact with the nets in their transit,—substantially as set forth.

30. A net-frame composed of two parallel angle-bars with their vertical members inward, which constitute its sides, and of two parallel T-bars with their heads horizontal and connected with the horizontal members of the angle-bars, and with their webs projecting vertically upward, which constitute its ends,—substantially as set forth.

31. A net-frame composed of two parallel angle-bars with their vertical members inward, which constitute its sides,—of two parallel T-bars with their heads horizontal and connected with the horizontal members of the angle-bars, and with their webs projecting vertically upward, which constitute its ends,—and of an additional T-bar connected to the heads of the aforesaid T-bars with its vertical member projecting downward,—substantially as set forth.

In testimony that I claim the foregoing as my invention I have hereunto signed my name this 22d day of January, A. D. 1894.

CHAS. W. COOPER.

In presence of—
J. BONSALL TAYLOR,
WM. C. STRAWBRIDGE.